US012803197B2

(12) United States Patent
Ito

(10) Patent No.: US 12,803,197 B2
(45) Date of Patent: Nov. 17, 2026

(54) CONNECTOR

(71) Applicant: Yamaichi Electronics Co., Ltd., Tokyo (JP)

(72) Inventor: Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 324 days.

(21) Appl. No.: 18/375,130

(22) Filed: Sep. 29, 2023

(65) Prior Publication Data

US 2025/0112391 A1 Apr. 3, 2025

(51) Int. Cl.
*H01R 12/73* (2011.01)

(52) U.S. Cl.
CPC .................................. *H01R 12/737* (2013.01)

(58) Field of Classification Search
CPC .. H01R 12/737; H01R 13/115; H01R 13/502; H01R 43/20
See application file for complete search history.

(56) References Cited

U.S. PATENT DOCUMENTS

| | | | | |
|---|---|---|---|---|
| 9,780,512 | B2 | 10/2017 | Hsu et al. | |
| 2015/0132985 | A1 | 5/2015 | Choi et al. | |
| 2017/0187157 | A1* | 6/2017 | Hsu ...................... | H05K 5/0295 |
| 2018/0342823 | A1 | 11/2018 | Chen | |
| 2020/0176930 | A1 | 6/2020 | Shioda | |
| 2024/0186733 | A1 | 6/2024 | Sato et al. | |

FOREIGN PATENT DOCUMENTS

| | | | |
|---|---|---|---|
| CN | 213340830 | U | 6/2021 |
| DE | 102023211029 | A1 | 5/2024 |
| EP | 3696921 | A1 | 8/2020 |
| EP | 4379967 | A1 | 6/2024 |
| JP | 2003168520 | A | 6/2003 |
| JP | 2011-146210 | A | 7/2011 |
| JP | 2015095447 | A | 5/2015 |
| TW | 511806 | U | 11/2002 |
| TW | M484226 | U | 8/2014 |
| TW | I766989 | B | 6/2022 |
| WO | 2016042625 | A1 | 3/2016 |

OTHER PUBLICATIONS

English translation of WO2016042625A1. (Year: 2016).*
Extended European Search Report issued Mar. 10, 2025 in EP Application No. 24201725.9.
Office Action and Search Report issued Jul. 25, 2025 in TW Application No. 113135843.

* cited by examiner

*Primary Examiner* — Sean Gugger
(74) *Attorney, Agent, or Firm* — Panitch Schwarze Belisario & Nadel LLP

(57) ABSTRACT

Provided is a connector in which a housing is reinforced in order to suppress deformation of the housing and thus realize good contact performance of contact pins. Outer housings 110, 110' each have a base part 111, an intermediate part 112, and a tip part 113 from the circuit board 20 side along the depth direction Dd, the base part 111 includes a bottom face **111*a* facing a circuit board 20, the tip part 113 includes a slot opening 113*a* configured to accept a module board 11 inserted, the intermediate part 112 includes a smaller dimension in the width direction Dw and/or a smaller dimension of the height direction Dh than the base part 111 and the tip part 113, and a frame 170, a second frame 180, and a frame 190 each are an annular plate having four sides surrounding the intermediate part 112**.

8 Claims, 30 Drawing Sheets

CONNECTOR

BACKGROUND

1. Technical Field

The present invention relates to a connector.

2. Description of Related Art

Some receptacle connectors mounted on a mounting circuit board may include a plurality of pin groups each having a plurality of contact pins and a housing for holding those pin groups.

In such a connector, a first pin group and a second pin group are arranged so as to face each other with a predetermined spacing therebetween, for example, and when a plug connector has been connected to the receptacle connector, a circuit board of the plug connector is inserted between the first pin group and the second pin group (for example, U.S. Pat. No. 9,780,512 and Japanese Patent Application Laid-Open No. 2011-146210).

When the circuit board has been inserted, a part of each contact pin of the first pin group and a part of each contact pin of the second pin group come into contact with the circuit board and are thus deformed in the direction away from each other. In this state, the portion of the contact pin in contact with the inner wall face of the housing applies outward force to the wall of the housing.

In response, the wall of the housing is deflected and deformed so as to expand outward by the force received from the contact pins. In particular, when it is not possible to connect mutually facing walls to each other (for example, when it is required to form a space inside the housing to accommodate other components), the walls of the housing are easily deformed. When the walls of the housing are then deformed, the contact load of each contact pin against the circuit board is reduced, which may lead to inability of obtaining desired contact performance.

Accordingly, the present invention intends to provide a connector in which a housing is reinforced in order to suppress deformation of the housing and thus realize good contact performance of contact pins.

BRIEF SUMMARY

To achieve the object described above, a connector of the present invention employs the following solutions.

A connector according to the first aspect of the present invention configured to be mounted on an external circuit board and receive an external module board of an external module inserted along a first direction includes: when a direction orthogonal to the first direction is defined as a second direction, and a direction orthogonal to the first direction and the second direction is defined as a third direction, a plurality of contact pins configured to come into contact with the external module board; a housing holding the plurality of contact pins; and a reinforcing member attached to the housing, the housing includes a base part, an intermediate part, and a tip part from the external circuit board side along the first direction, the base part includes a bottom face facing the external circuit board, the tip part includes a slot opening into which the external module board is to be inserted, the intermediate part includes a smaller dimension in the second direction and/or a smaller dimension of the third direction than the base part and the tip part, and the reinforcing member is an annular plate having four sides surrounding the intermediate part.

According to the connector of the present aspect, the reinforcing member is attached, thereby the housing can be reinforced, and deformation of the housing can thus be suppressed. Accordingly, the contact pressure of the contact pins can be suitably maintained. Thus, good signal transmission characteristics can be realized up to a high-frequency range.

In the connector according to the second aspect of the present invention, dependent on first aspect, the tip part and the base part have substantially the same dimension in the second direction, and the intermediate part includes at least a smaller dimension in the second direction than the base part and the tip part.

According to the connector of the present aspect, the inner dimensions of the reinforcing member can be increased. This can improve the rigidity of the reinforcing member.

In the connector according to the third aspect of the present invention dependent on first aspect and the second aspect, the reinforcing member is configured such that at least one side of the four sides and the remaining sides are dividable from each other.

According to the connector of the present aspect, even with the constricted intermediate part, the reinforcing member can be attached to the intermediate part.

The connector according to the fourth aspect of the present invention dependent on any one of the first aspect to the third aspect, includes a second reinforcing member attached to the housing, and the second reinforcing member is an annular plate having four sides surrounding the intermediate part, and is overlapped on the reinforcing member and configured such that at least one side of the four sides and the remaining sides are dividable from each other.

According to the connector of the present aspect, the second reinforcing member is attached, thereby the housing can be further reinforced, and deformation of the housing can thus be further suppressed. Accordingly, good contact performance of contact pins can be realized.

In the connector according to the fifth aspect of the present invention dependent on fourth aspect, the reinforcing member is configured such that a divided piece that is one side of the four sides is dividable from remaining three sides, the second reinforcing member is configured such that a second divided piece that is one side of the four sides is dividable from remaining three sides, and the divided piece and the second divided piece are at positions facing each other when viewed in the first direction.

According to the connector of the present aspect, since it is avoided that two connection portions (connection portions between the divided piece and other portions) whose strength may be inferior to other portions are arranged only on one side of the intermediate part, the intermediate part can be uniformly reinforced over the entire circumference thereof.

In the connector according to the sixth aspect of the present invention dependent on fifth aspect or the second aspect, the housing is configured such that the base part and the tip part are dividable from each other.

According to the connector of the present aspect, even with the constricted intermediate part, the reinforcing member can be attached to the intermediate part.

In the connector according to the seventh aspect of the present invention dependent on any one of the first aspect to the sixth aspect, the plurality of contact pins have, from a tip to a base end, a contact part configured to come into contact with the external module board, a press-fit part configured to be press-fitted into the housing and a mount part configured to be mounted on the external circuit board, and include a signal pin for signal transmission and a ground pin for grounding, and in the ground pin, a portion that is closer to the mount part than the press-fit part is branched into two portions.

According to the connector of the present aspect, so-called double ground in which a pair of ground pins are arranged between a pair of signal pins (differential pair) and another differential pair is formed, and crosstalk between differential pairs is thus reduced.

In the connector according to the eighth aspect of the present invention dependent on any one of the first aspect to the seventh aspect, the external module is a module having a protection wall for protecting the external module board, the protection wall is provided substantially parallel to the external module board, and the tip part includes a recess adapted to a shape of the protection wall.

According to the connector of the present aspect, it is possible to prevent the connector from interfering with the protection wall when the external module has been inserted into the connector.

DETAILED DESCRIPTION

Connectors according to a first embodiment and a second embodiment of the present invention will be described below with reference to the drawings.

Note that an insertion-extraction direction Die, a depth direction Dd, a width direction Dw, and a height direction Dh used in the following description are intended to assist in understanding the description and based on FIG. 1 and FIG. 2. However, these directions are not intended to limit actual postures or positions.

Further, when the direction in which an optical module is inserted/extracted is defined as the insertion-extraction direction Die (first direction), the depth direction Dd matches the insertion-extraction direction Die, the width direction Dw (second direction) is orthogonal to the depth direction Dd, and the height direction Dh (third direction) is orthogonal to the depth direction Dd and the width direction Dw.

First Embodiment

The connector according to the first embodiment of the present invention will be described with reference to the drawings.

<Basic Configuration>

Figure 1:
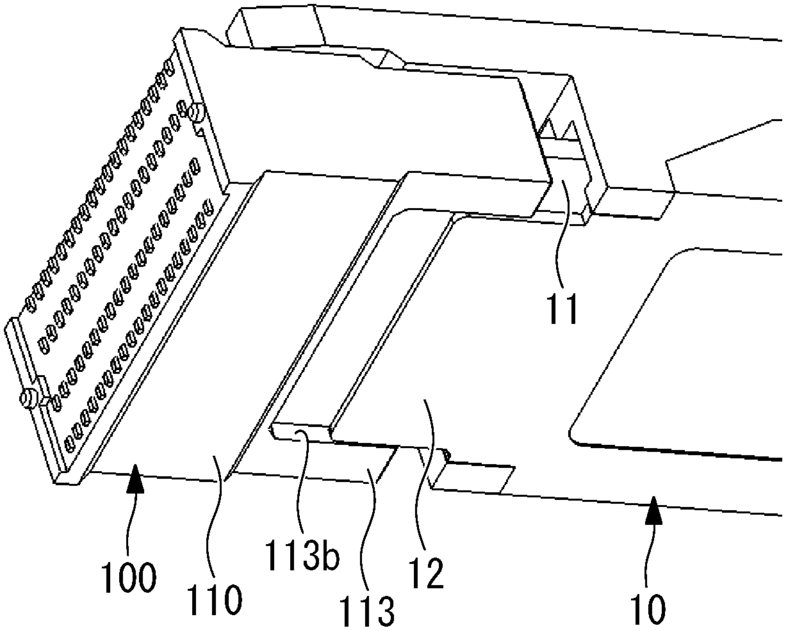
FIG. 1 is a perspective view of a connector into which an optical module is inserted when viewed from below.
Figure 1:
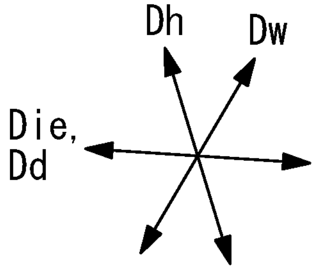
Figure 2:
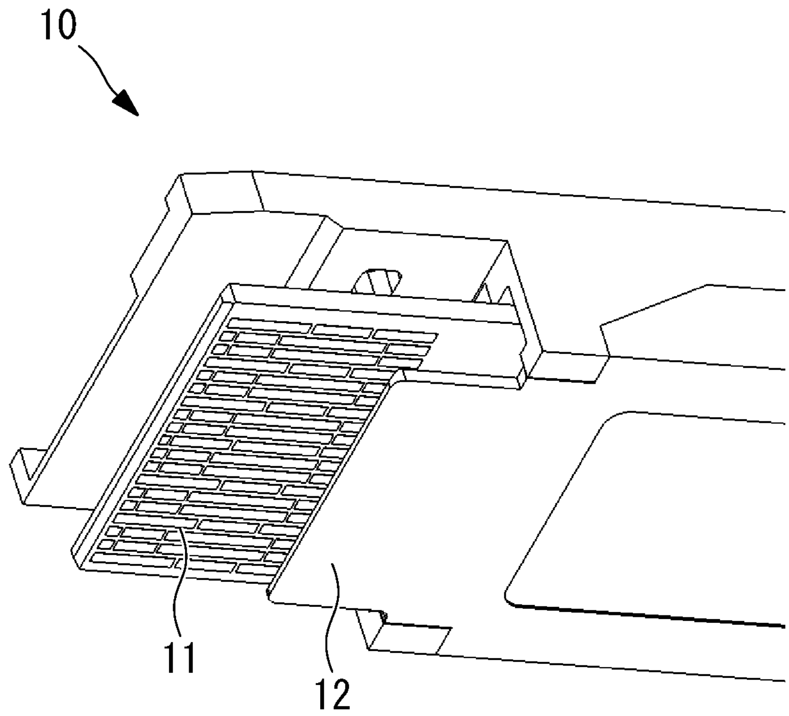
FIG. 2 is a perspective view of the optical module when viewed from below.
Figure 2:
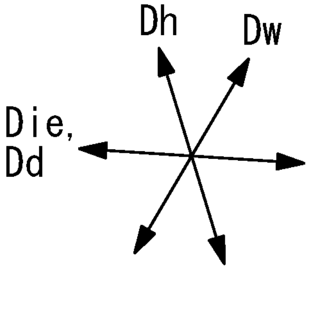

As illustrated in FIG. 1 or FIG. 2, a connector 100 is a receptacle connector into which a module board 11 of an optical module 10 is inserted along the insertion-extraction direction Die.

The optical module 10 is compatible to a form factor such as QSFP-DD or OSFP-DD.

Figure 3:
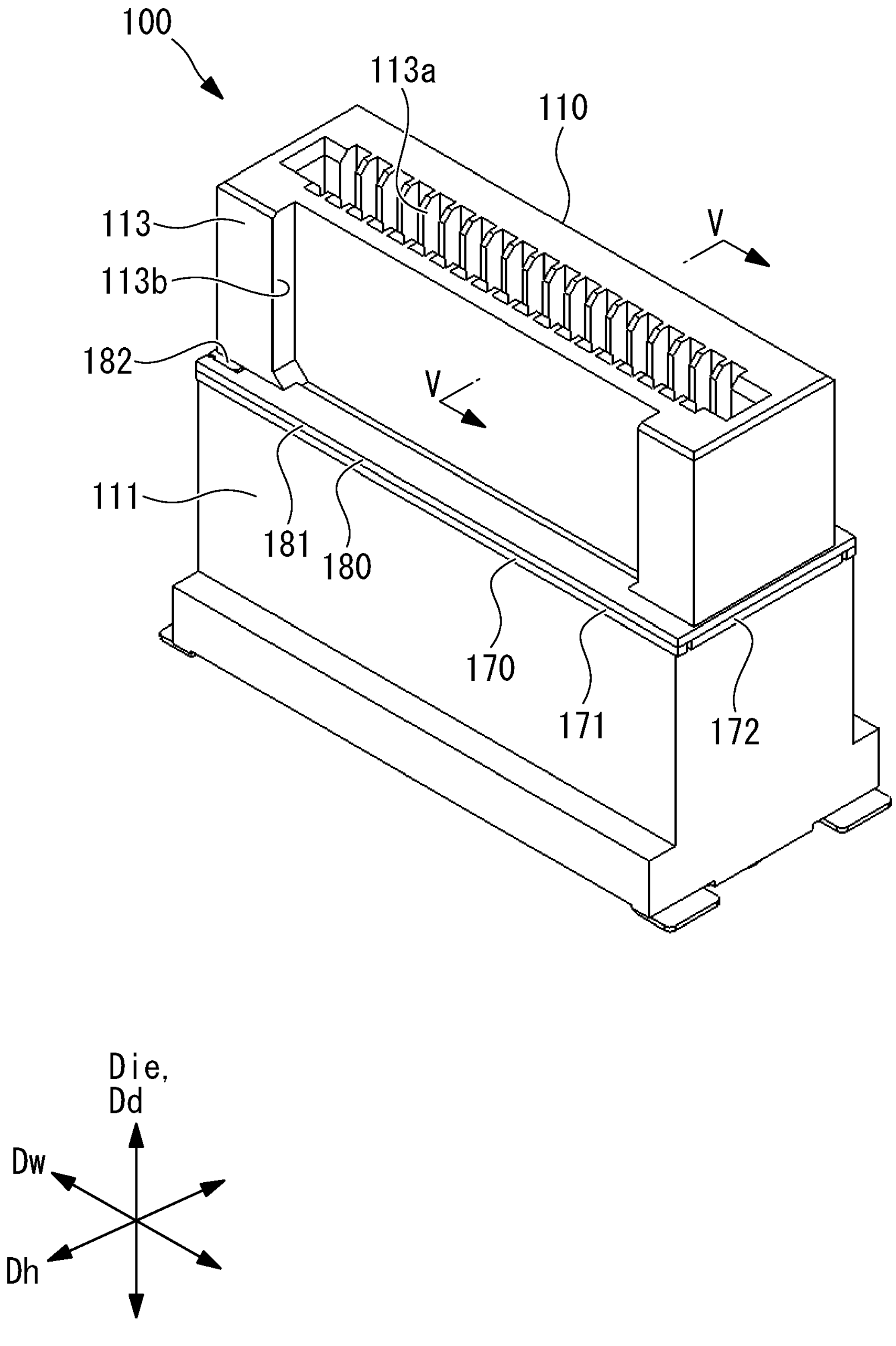
FIG. 3 is a perspective view of the connector according to a first embodiment when viewed from above.
Figure 4:
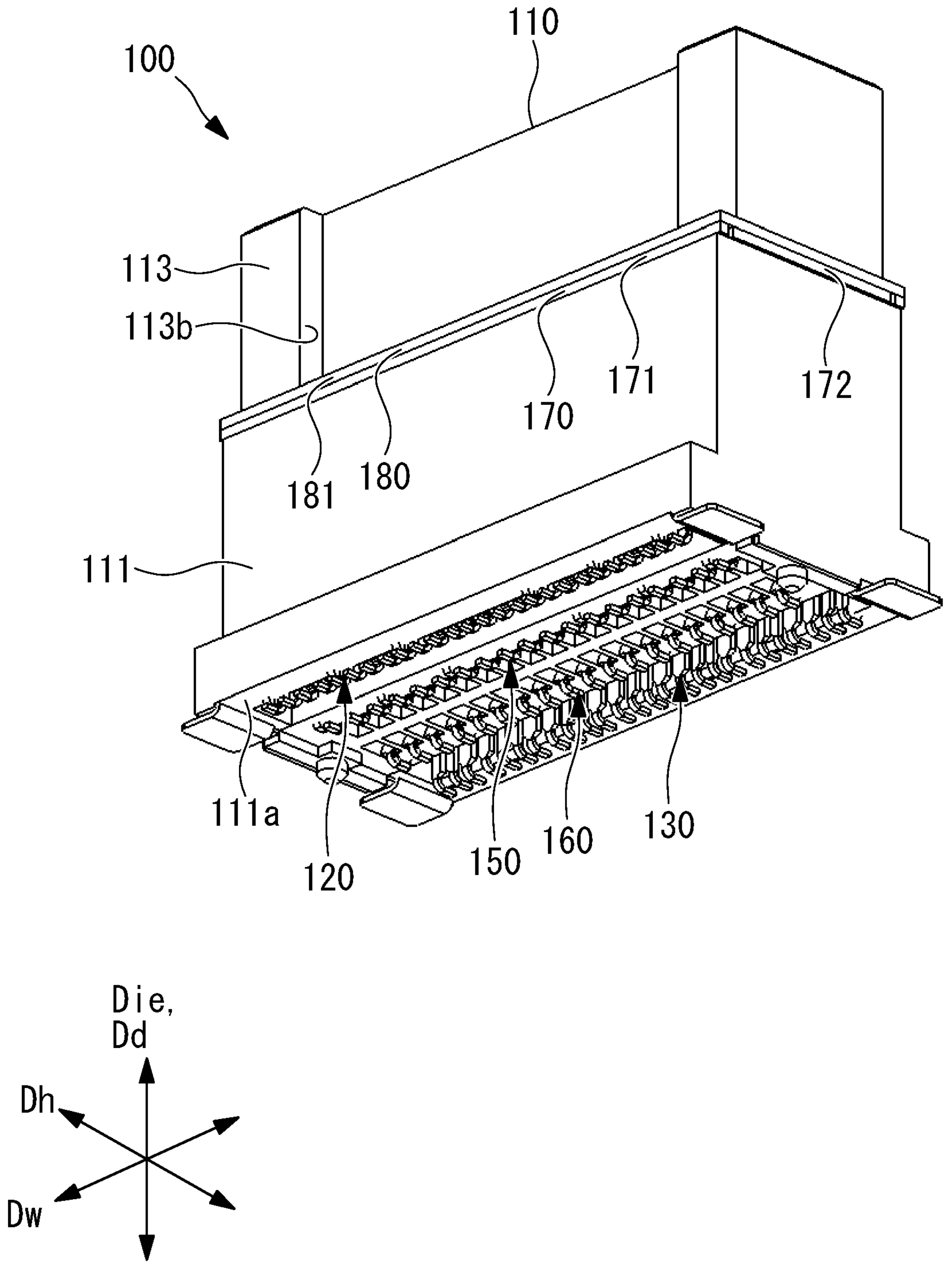
FIG. 4 is a perspective view of the connector according to the first embodiment when viewed from below.
Figure 5:
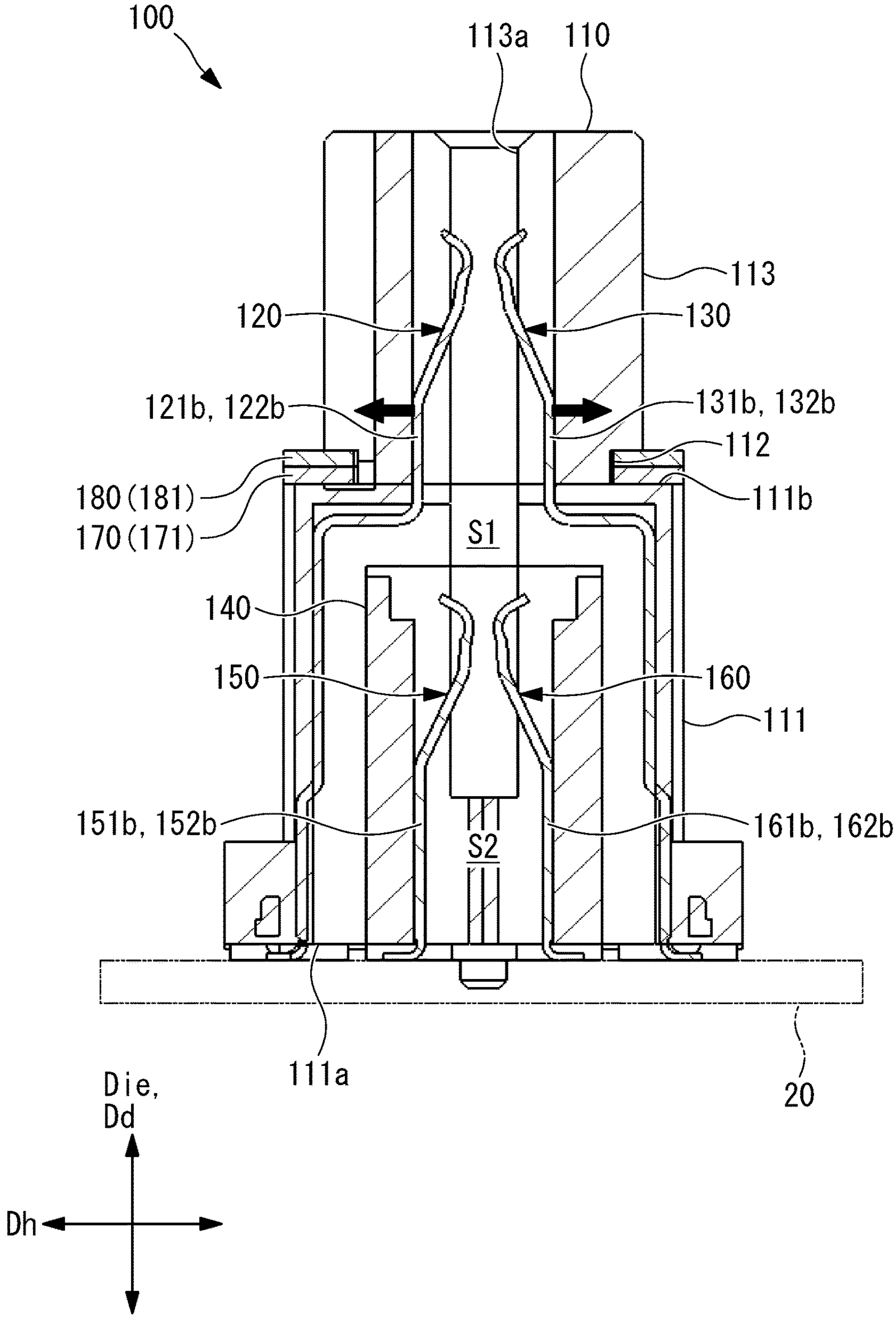
FIG. 5 is a sectional view taken along a cut line V-V illustrated in FIG. 3.

As illustrated in FIG. 3, FIG. 4, and FIG. 5, the connector 100 includes an outer housing 110, a first pin group 120 and a second pin group 130 held in the outer housing 110, an inner housing 140, a third pin group 150 and a fourth pin group 160 held in the inner housing 140, a frame 170 (reinforcing member), and a second frame 180 (second reinforcing member). As illustrated in FIG. 5, the inner housing 140 is configured to be housed in the outer housing 110.

As illustrated in FIG. 5, FIG. 6, FIG. 7, and FIG. 8, the outer housing 110 has a base part 111, an intermediate part 112, and a tip part 113, and a space S1 defined by inner wall faces is formed inside thereof.

These parts are arranged in the order of the base part 111, the intermediate part 112, and the tip part 113 from a circuit board 20 side along the depth direction Dd and integrally molded.

Figure 6:
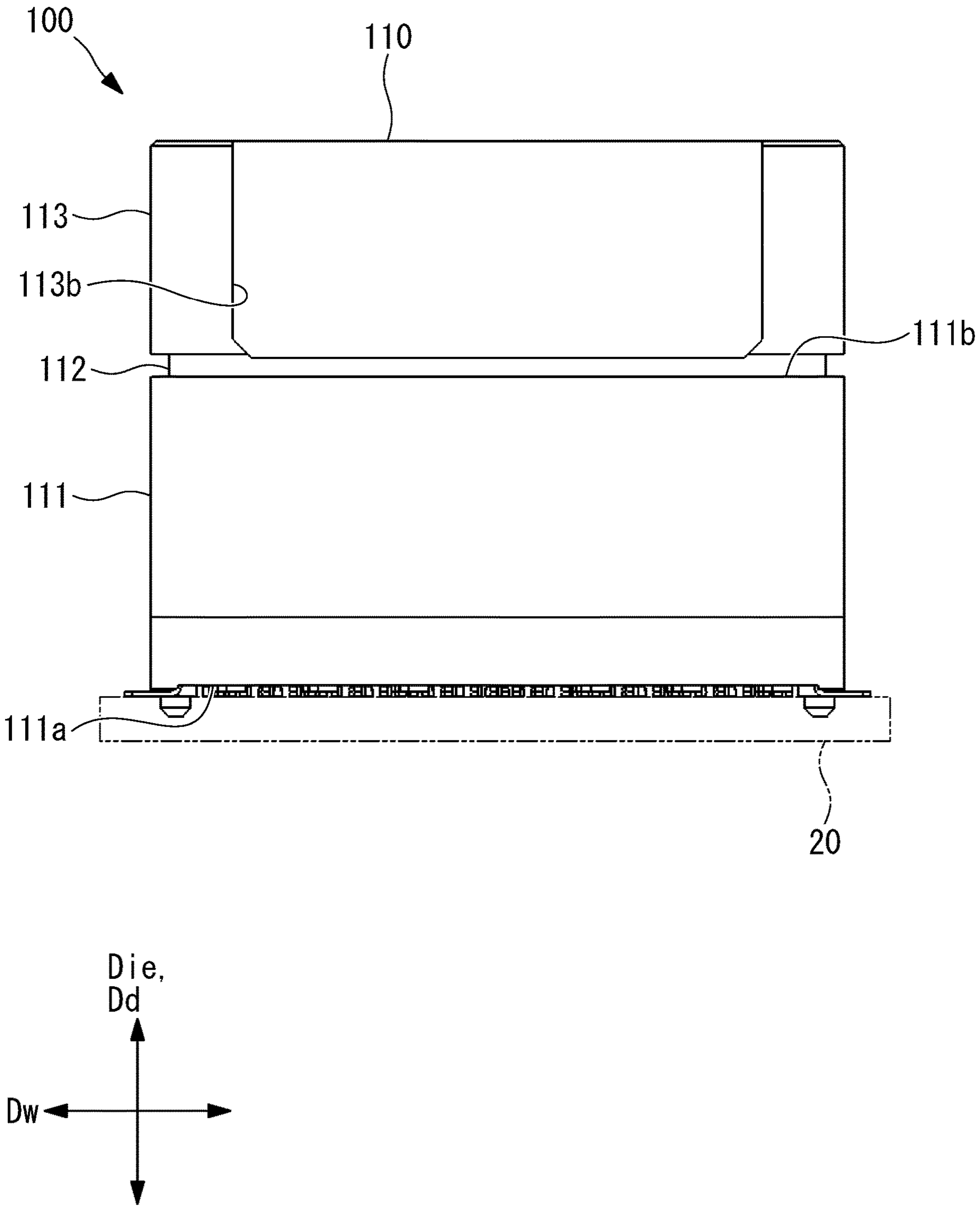
FIG. 6 is a front view of the connector according to the first embodiment (a frame omitted).
Figure 7:
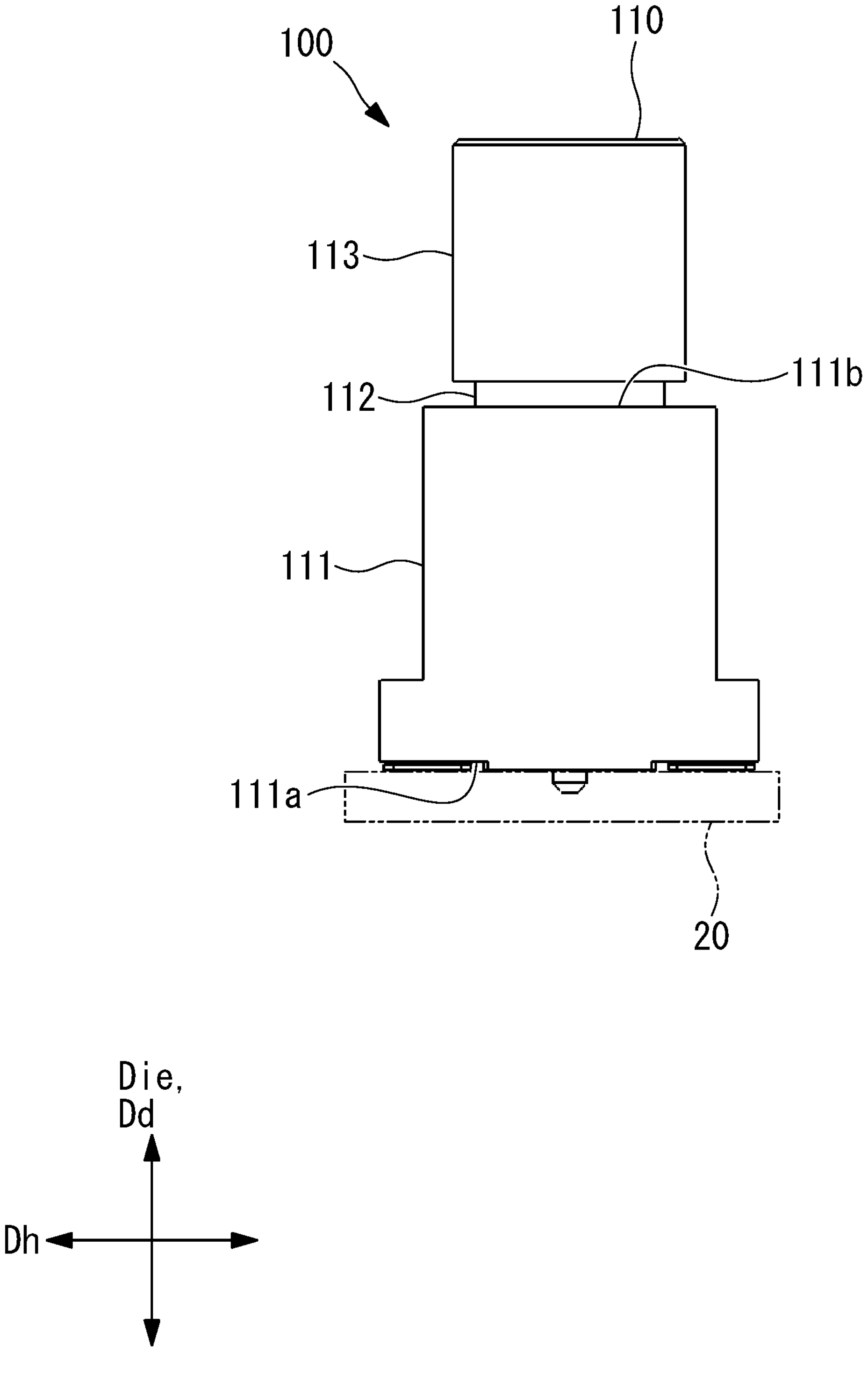
FIG. 7 is a side view of the connector according to the first embodiment (the frame omitted).
Figure 8:
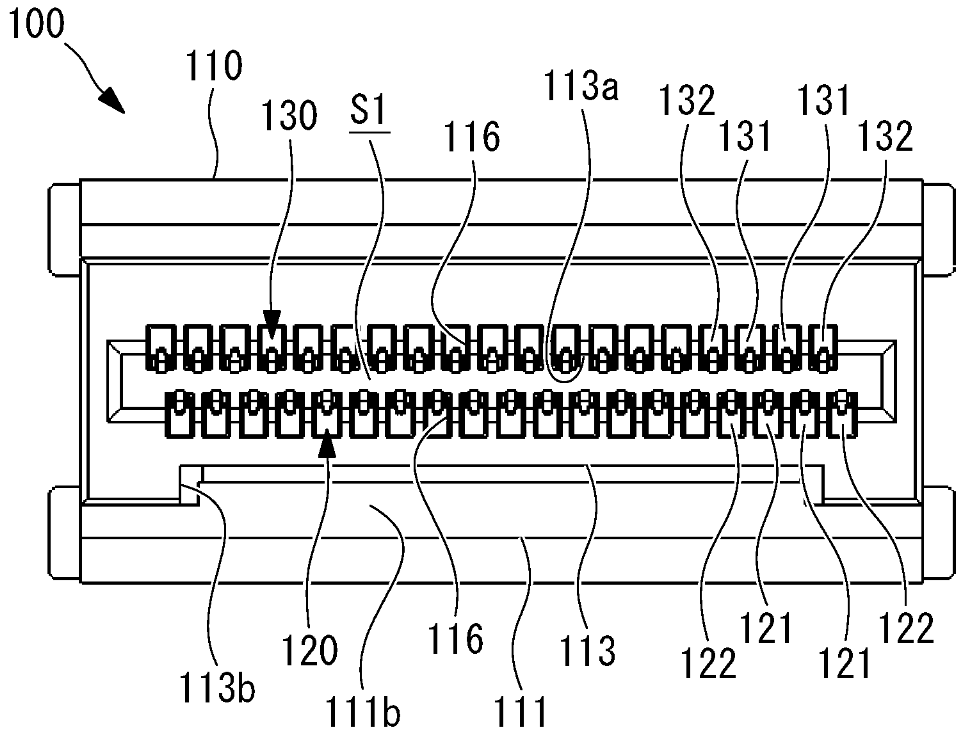
FIG. 8 is a plan view of the connector according to the first embodiment (the frame omitted).
Figure 8:
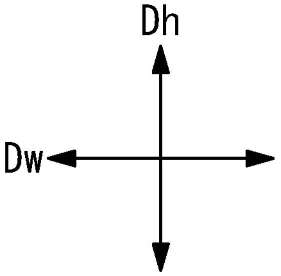

As illustrated in FIG. 6, FIG. 7, and FIG. 8, the base part 111 is a portion having a bottom face 111*a* facing the circuit board 20 and forms a base end part (a portion facing the circuit board 20) of the outer housing 110.

As illustrated in FIG. 7, the base part 111 has a stepped structure and is configured such that the dimension in the height direction Dh decreases at a certain dimension distant from the bottom face 111*a* along the depth direction Dd.

As illustrated in FIG. 6, FIG. 7, and FIG. 8, the tip part 113 is a portion in which a slot opening 113*a* into which the module board 11 is inserted is formed and forms a tip portion of the outer housing 110. The slot opening 113*a* communicates with the space S1 formed inside the outer housing 110.

The dimension in the height direction Dh of the tip part 113 (hereafter, referred to as "height dimension") may be less than the height dimension of the base part 111. However, the dimension in the width direction Dw of the tip part 113 (hereafter, referred to as "width dimension") may be substantially the same as the width dimension of the base part 111.

The intermediate part 112 is a portion between the base part 111 and the tip part 113 in the depth direction Dd.

Herein, the height dimension and the width dimension of the intermediate part 112 are defined as (1) or (2) below.

(1) The height dimension of the intermediate part 112 is less than the height dimension of the base part 111 and the height dimension of the tip part 113. In addition, the width dimension of the intermediate part 112 is less than the width dimension of the base part 111 and the width dimension of the tip part 113.

(2) The height dimension of the intermediate part 112 is less than the height dimension of the base part 111 and the height dimension of the tip part 113. Alternatively, the width dimension of the intermediate part 112 is less than the width dimension of the base part 111 and the width dimension of the tip part 113.

Even in any case of (1) or (2) described above, the outer housing 110 has a constricted shape of the height dimension and/or the width dimension in the intermediate part 112.

The dimension in the depth direction Dd of the intermediate part 112 (hereafter, referred to as "depth dimension") is not particularly limited but is sufficiently less than the depth dimension of the base part 111 and the depth dimension of the tip part 113 in the case of the present embodiment. However, the depth dimension is large enough to attach the frame 170 or the like described later thereto.

Figure 9:
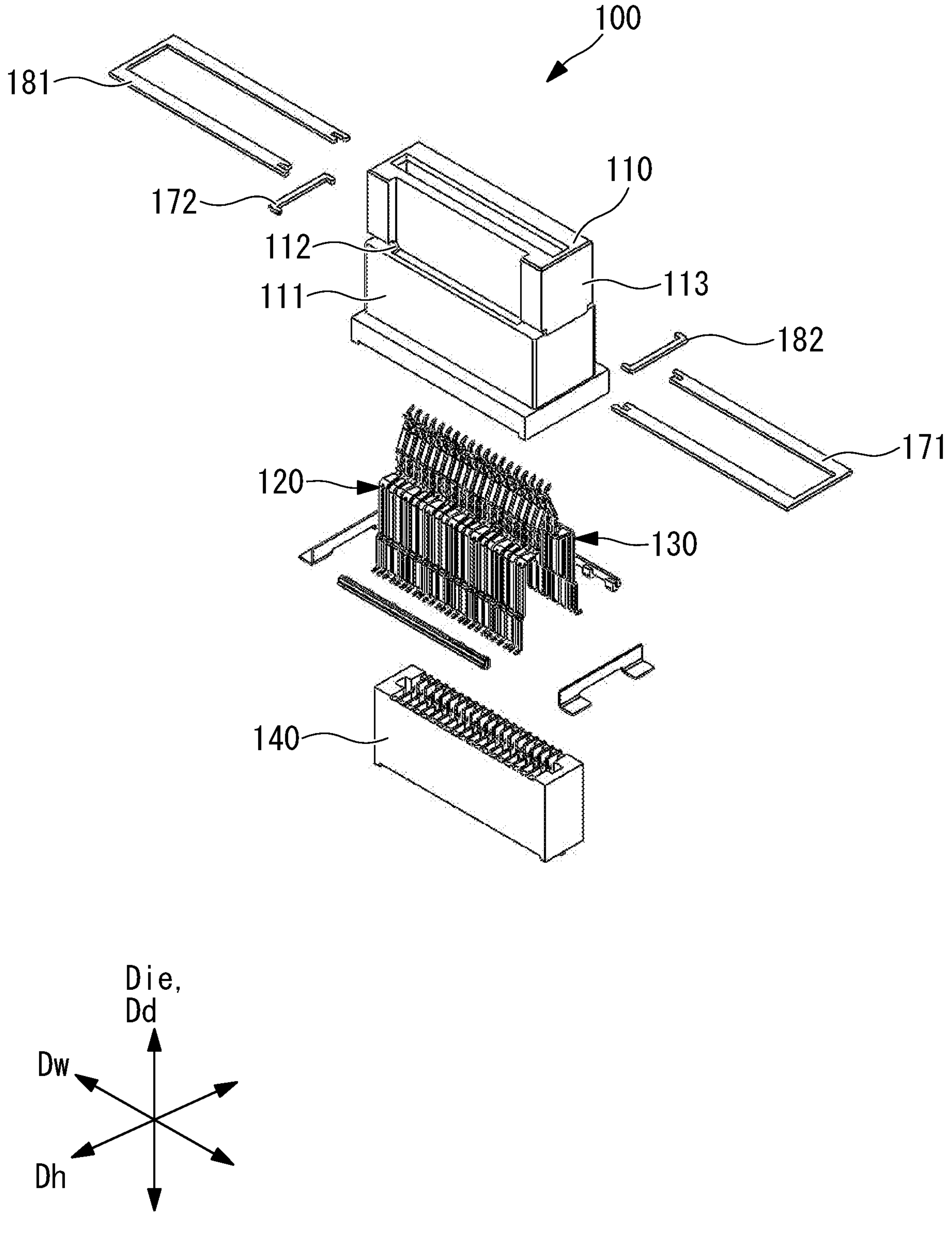
FIG. 9 is an exploded perspective view of the connector according to the first embodiment.

As illustrated in FIG. 5 and FIG. 9, the first pin group 120 and the second pin group 130 are held in the outer housing 110.

Figure 10:
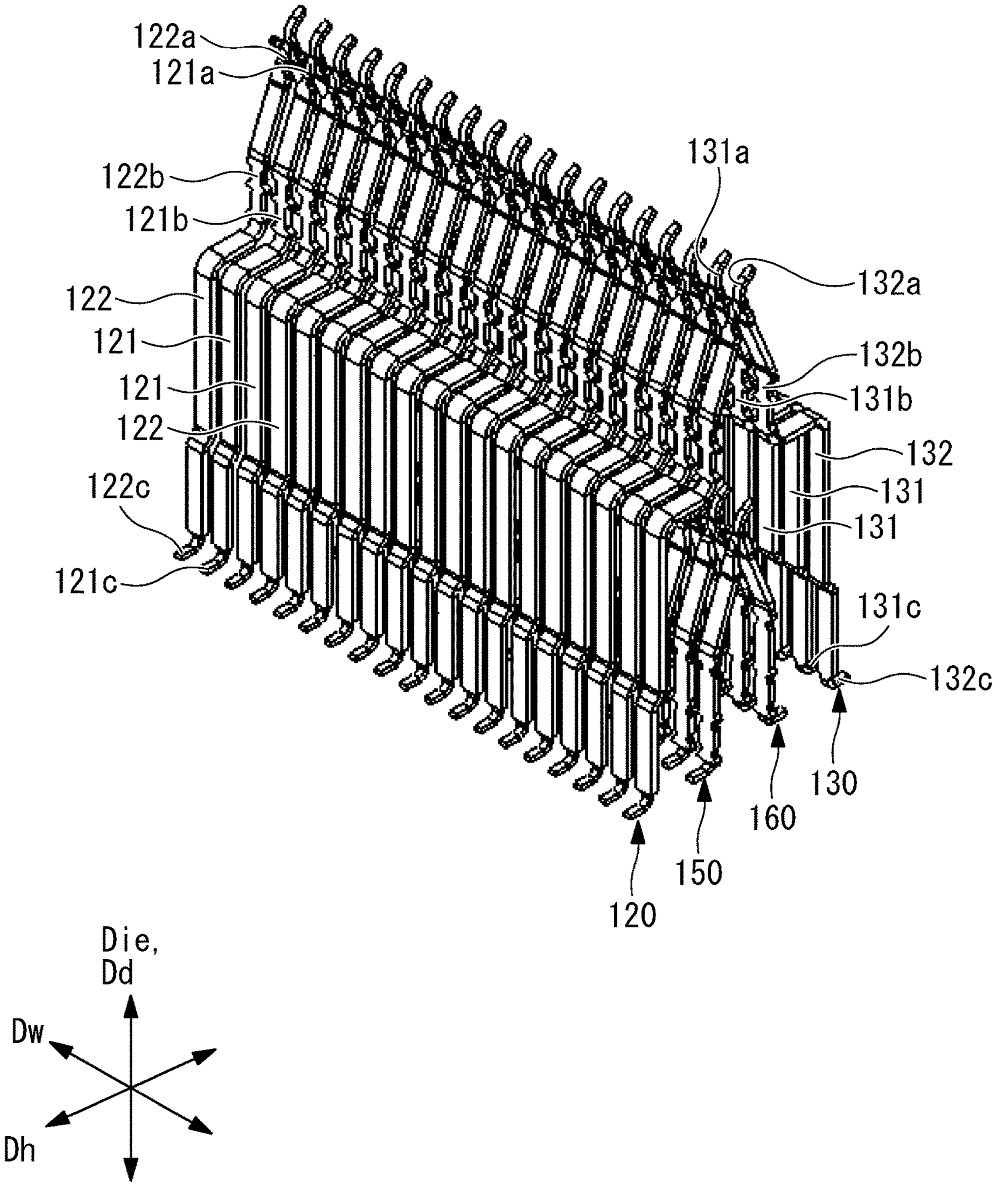
FIG. 10 is a perspective view of a first pin group to a fourth pin group when viewed from above.
Figure 11:
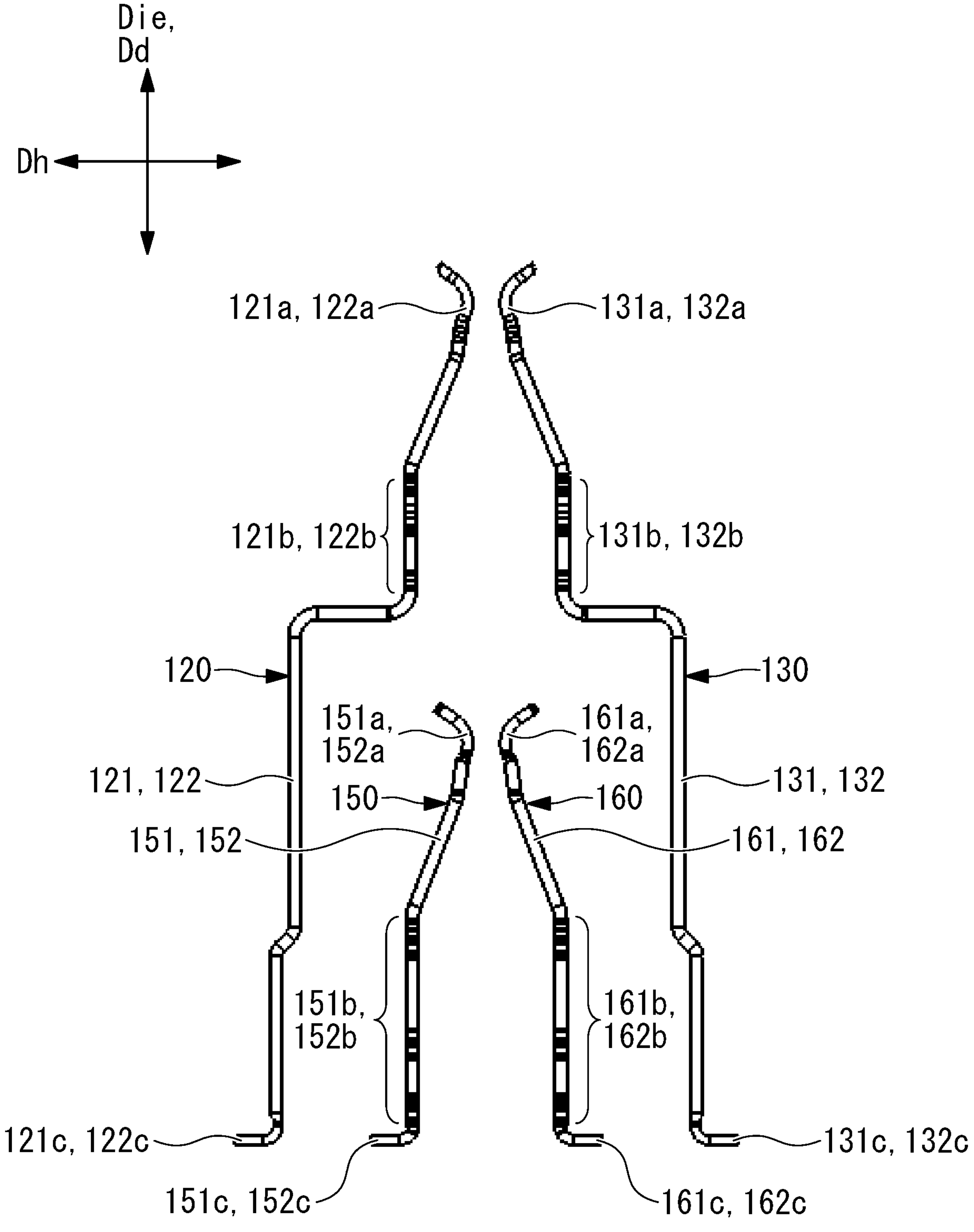
FIG. 11 is a side view of the first pin group to the fourth pin group.
Figure 12:
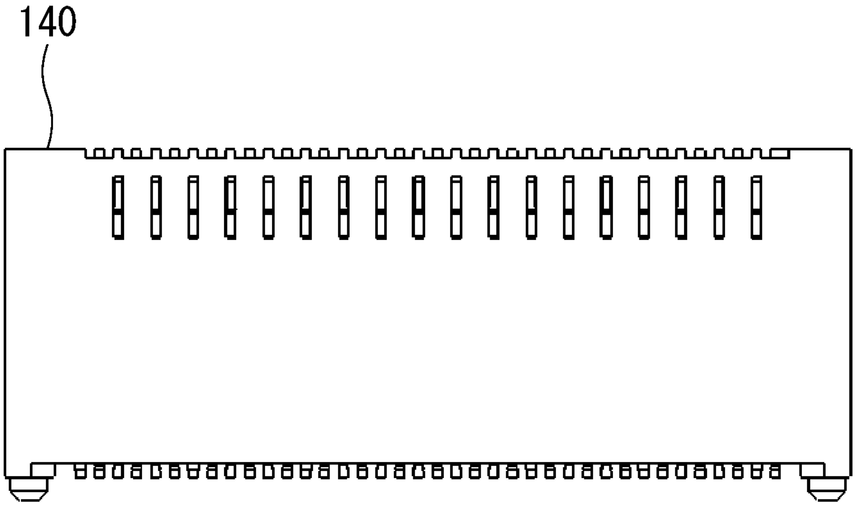
FIG. 12 is a front view of an inner housing.
Figure 12:
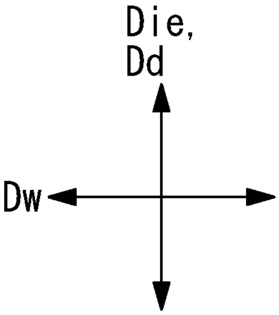
Figure 13:
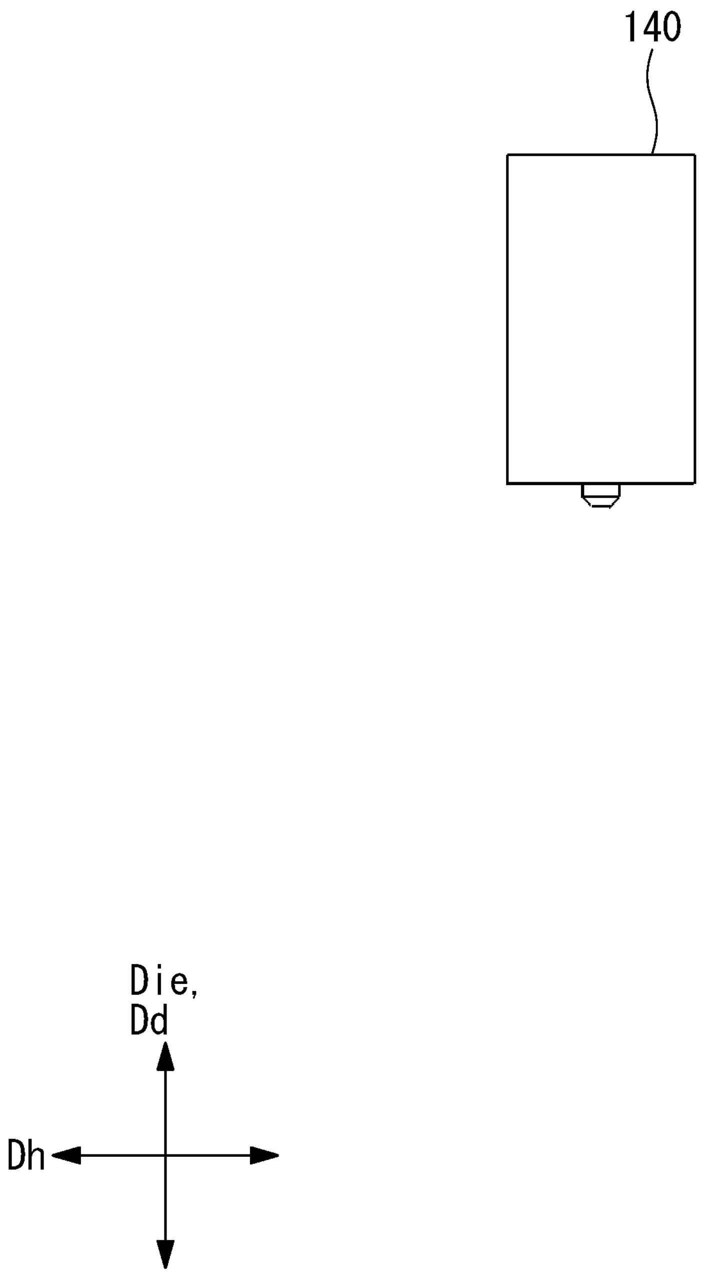
FIG. 13 is a side view of the inner housing.

As illustrated in FIG. 10 and FIG. 11, the first pin group 120 has a plurality of contact pins aligned in the width direction Dw. Signal pins 121 and ground pins 122 are included in the plurality of contact pins.

The second pin group 130 has a plurality of contact pins aligned in the width direction Dw. Signal pins 131 and ground pins 132 are included in the plurality of contact pins.

The first pin group 120 and the second pin group 130 are arranged facing each other with a predetermined spacing therebetween in the height direction Dh.

As illustrated in FIG. 11, the signal pin 121 has a contact part 121*a*, a press-fit part 121*b*, and a mount part 121*c* in this order from one end. Hereafter, for purposes of illustration, an end near the contact part 121*a* is referred to as "tip", and an end near the mount part 121*c* is referred to as "base end" (the same applies to other contact pins).

The contact part 121*a* is a portion that comes into contact with an electrode of the module board 11, and the contact part 121*a* includes a top that is convex toward the center.

The press-fit part 121*b* is a portion press-fitted into the outer housing 110 and includes a plurality of protrusions projecting in the width direction Dw (see FIG. 10).

The mount part 121*c* is a portion connected to an electrode of the circuit board 20.

The ground pin 122 also has a contact part 122*a*, a press-fit part 122*b*, and a mount part 122*c* in the same manner as the signal pin 121.

The signal pin 131 also has a contact part 131*a*, a press-fit part 131*b*, and a mount part 131*c* in the same manner as the signal pin 121.

The ground pin 132 also has a contact part 132*a*, a press-fit part 132*b*, and a mount part 132*c* in the same manner as the signal pin 121.

As illustrated in FIG. 5 and FIG. 8, the first pin group 120 and the second pin group 130 configured as described above are housed in the space S1 of the outer housing 110. The press-fit parts 121*b*, 122*b*, 131*b*, 132*b* of each contact pin are press-fitted into a plurality of grooves 116 formed in the inner wall face of the outer housing 110 and thereby held in the outer housing 110.

The plurality of grooves 116 corresponding to each pin group extend in the depth direction Dd and are arranged at a predetermined pitch in the width direction Dw. Further, the plurality of grooves 116 corresponding to the first pin group 120 face the plurality of grooves 116 corresponding to the second pin group 130 in the height direction Dh while being shifted by half a pitch in the width direction Dw.

As illustrated in FIG. 5, FIG. 12, FIG. 13, and FIG. 14, the inner housing 140 has a substantially rectangular parallelepiped shape, and a space S2 defined by inner wall faces is formed inside thereof.

Figure 15:
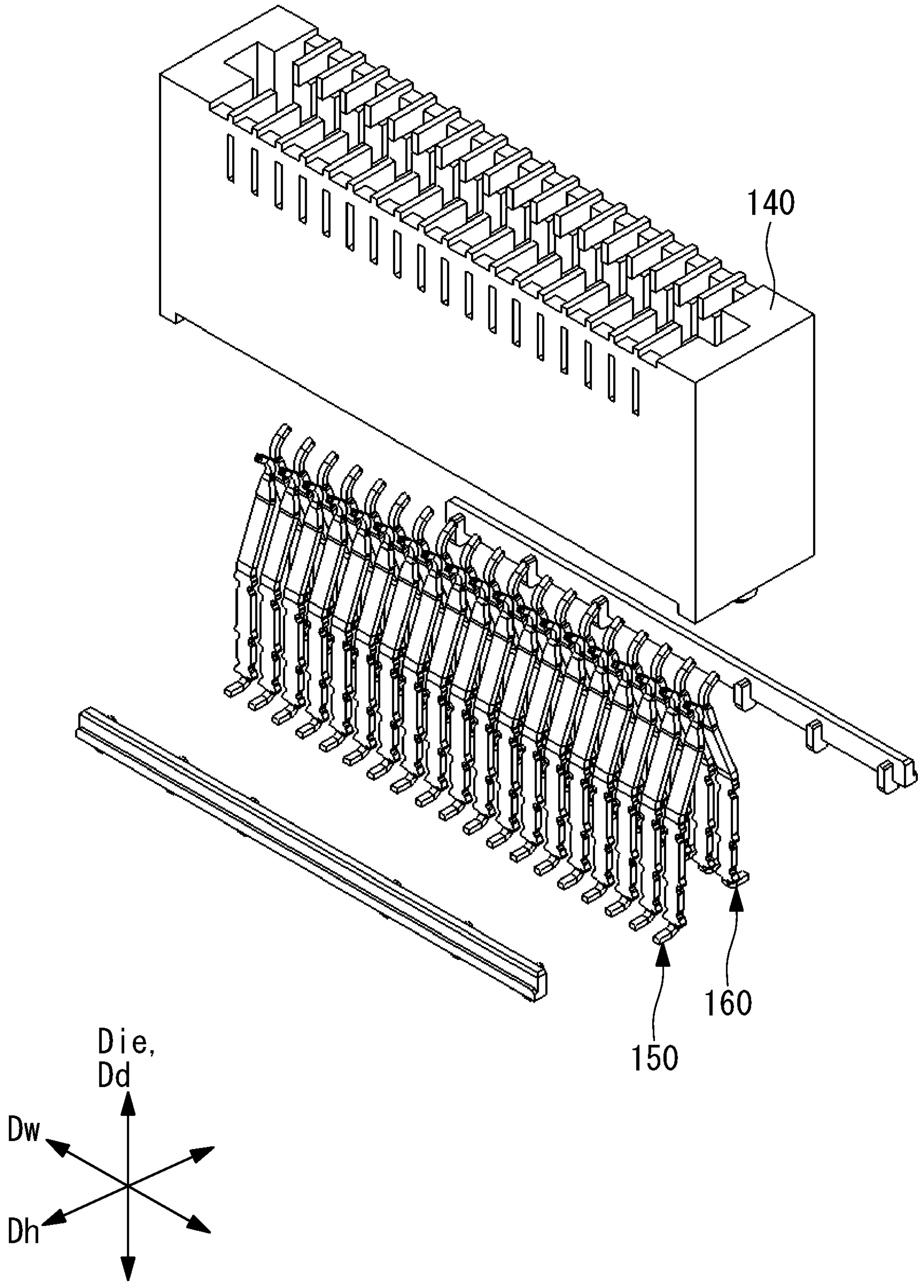
FIG. 15 is an exploded perspective view of the inner housing.

As illustrated in FIG. 5 and FIG. 15, the third pin group 150 and the fourth pin group 160 are held in the inner housing 140.

Figure 16:
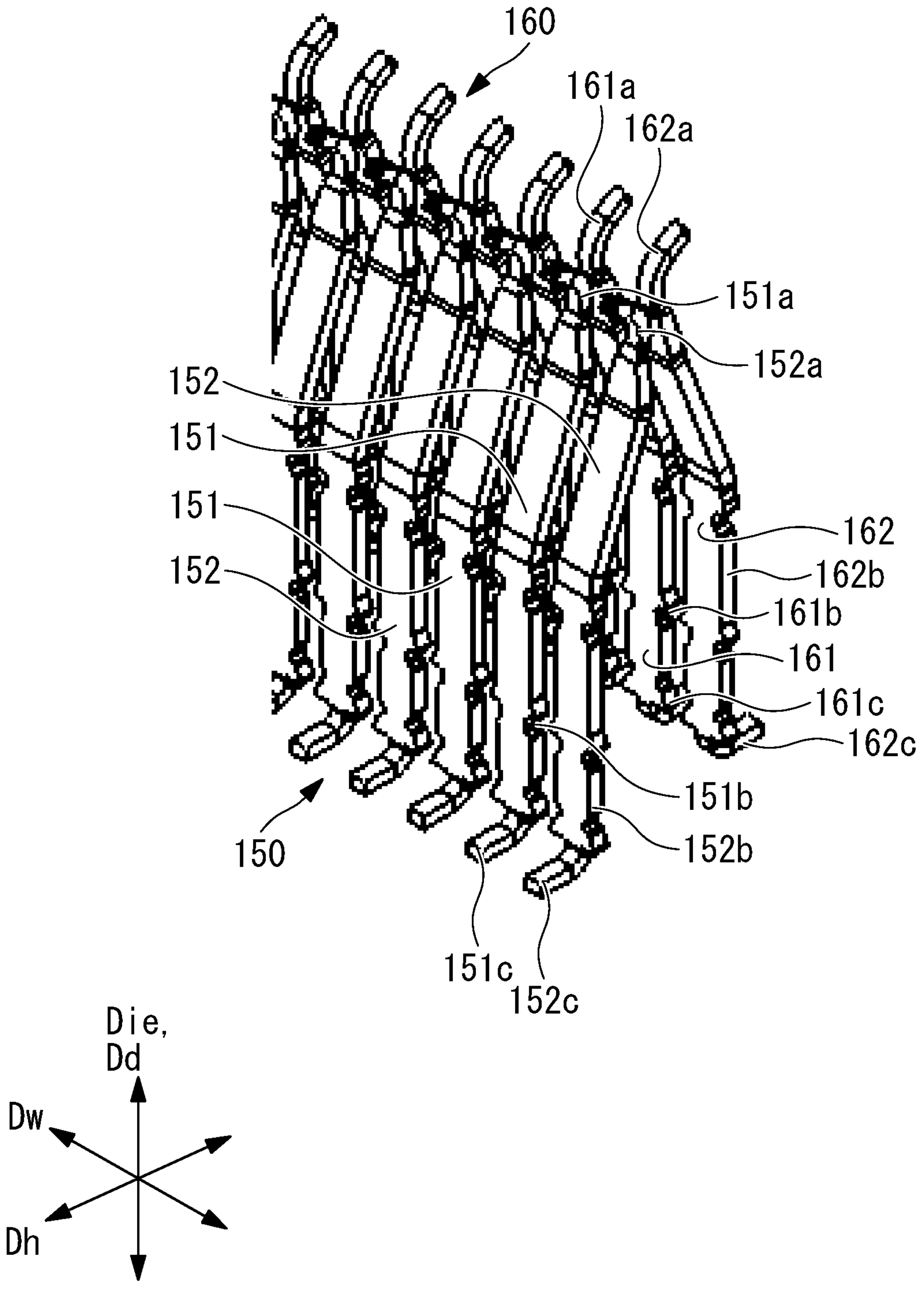
FIG. 16 is a perspective view of the third pin group and the fourth pin group when viewed from above.
Figure 17:
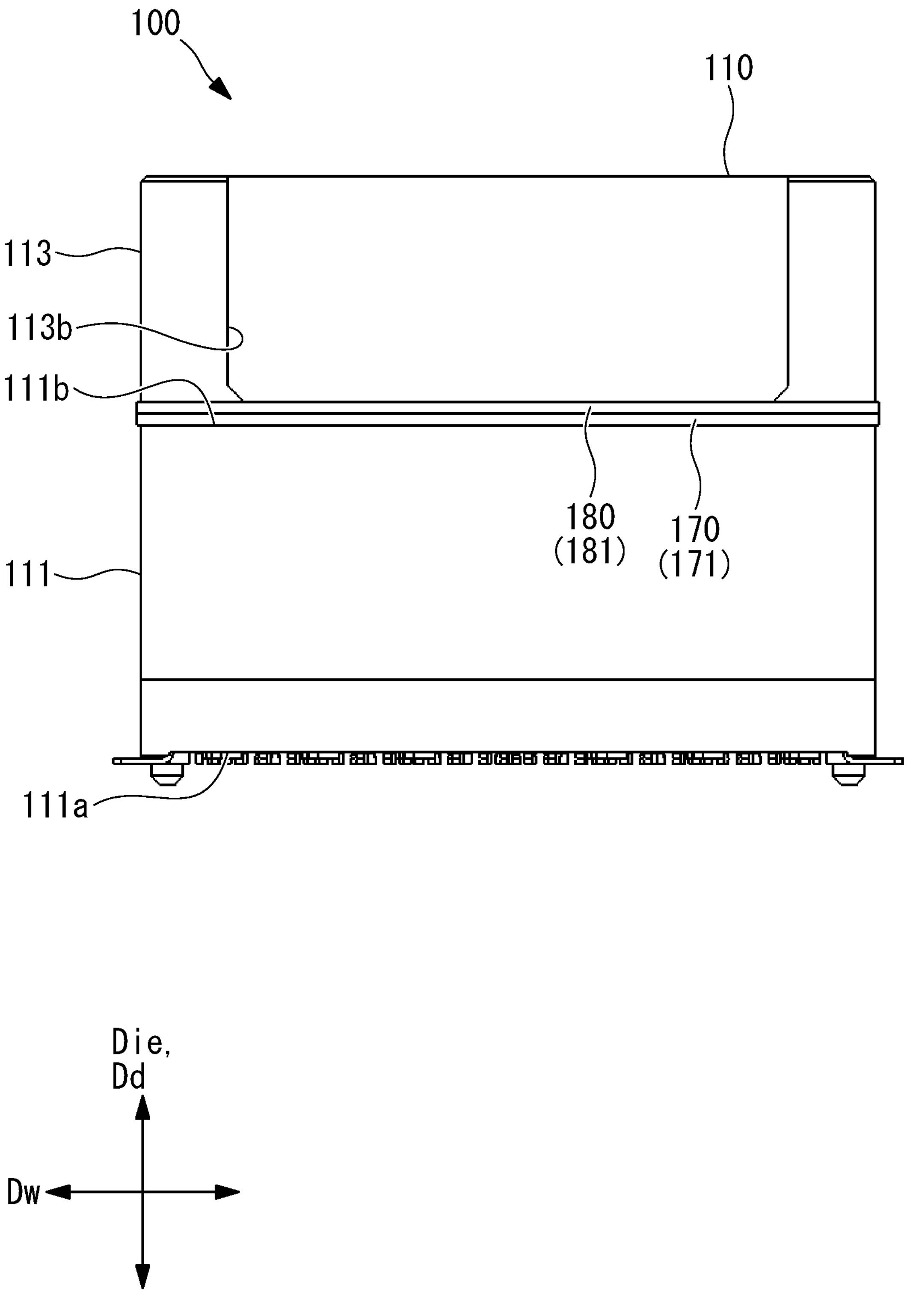
FIG. 17 is a front view of the connector according to the first embodiment.
Figure 18:
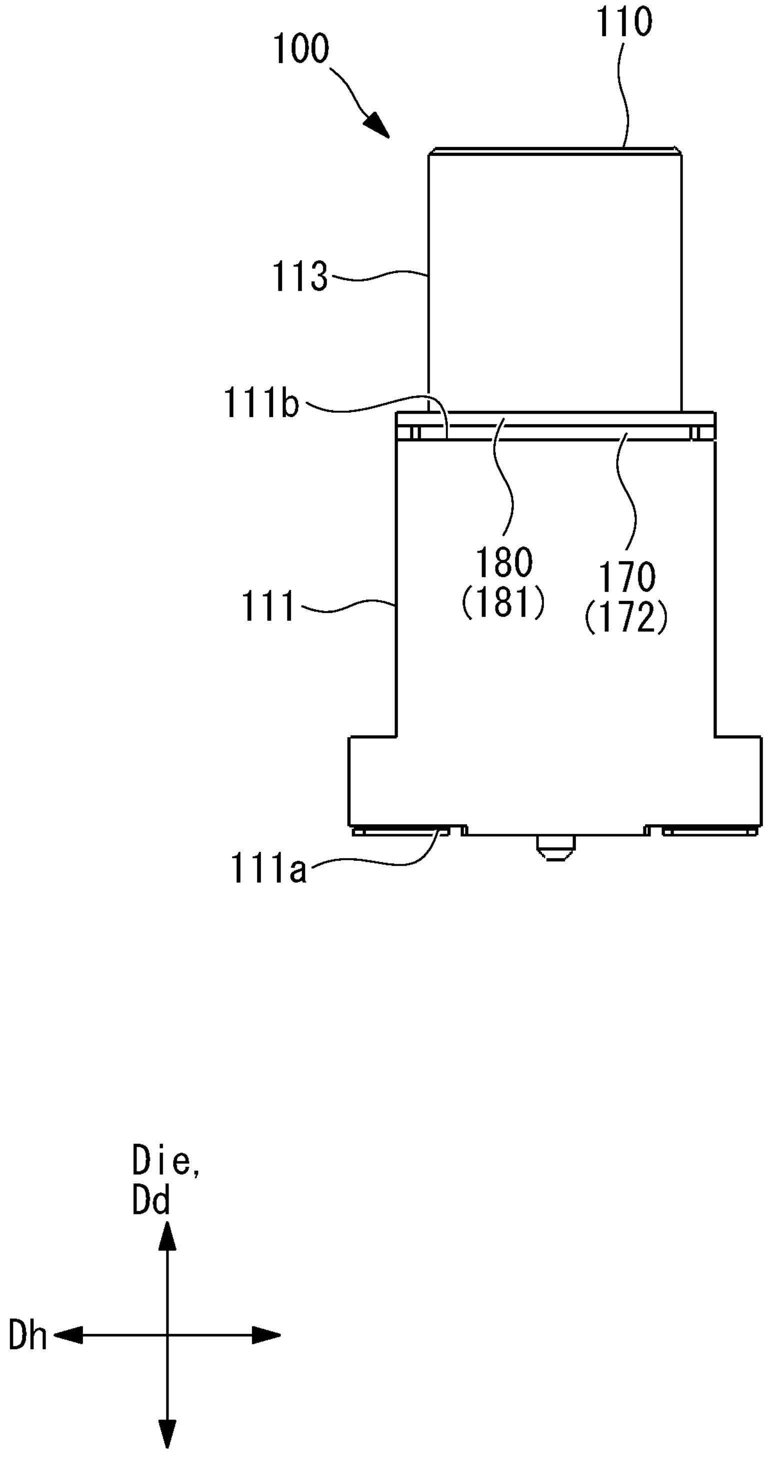
FIG. 18 is a side view of the connector according to the first embodiment.

As illustrated in FIG. 11 and FIG. 16, the third pin group 150 has a plurality of contact pins aligned in the width direction Dw. Signal pins 151 and ground pins 152 are included in the plurality of contact pins. The plurality of contact pins are shorter than contact pins of the first pin group 120 and the second pin group 130.

The fourth pin group 160 has a plurality of contact pins aligned in the width direction Dw. Signal pins 161 and ground pins 162 are included in the plurality of contact pins. The plurality of contact pins are shorter than contact pins of the first pin group 120 and the second pin group 130.

The third pin group 150 and the fourth pin group 160 are arranged facing each other with a predetermined spacing therebetween in the height direction Dh.

As illustrated in FIG. 11, the signal pin 151 has a contact part 151*a*, a press-fit part 151*b*, and a mount part 151*c* in this order from one end.

The contact part 151*a* is a portion that comes into contact with an electrode of the module board 11, and the contact part 151*a* includes a top that is convex towards the center.

The press-fit part 151*b* is a portion press-fitted into the inner housing 140 and includes a plurality of protrusions projecting in the width direction Dw (see FIG. 16).

The mount part 151*c* is a portion connected to an electrode of the circuit board 20.

The ground pin 152 also has a contact part 152*a*, a press-fit part 152*b*, and a mount part 152*c* in the same manner as the signal pin 151.

The signal pin 161 also has a contact part 161*a*, a press-fit part 161*b*, and a mount part 161*c* in the same manner as the signal pin 151.

The ground pin 162 also has a contact part 162*a*, a press-fit part 162*b*, and a mount part 162*c* in the same manner as the signal pin 151.

Figure 14:
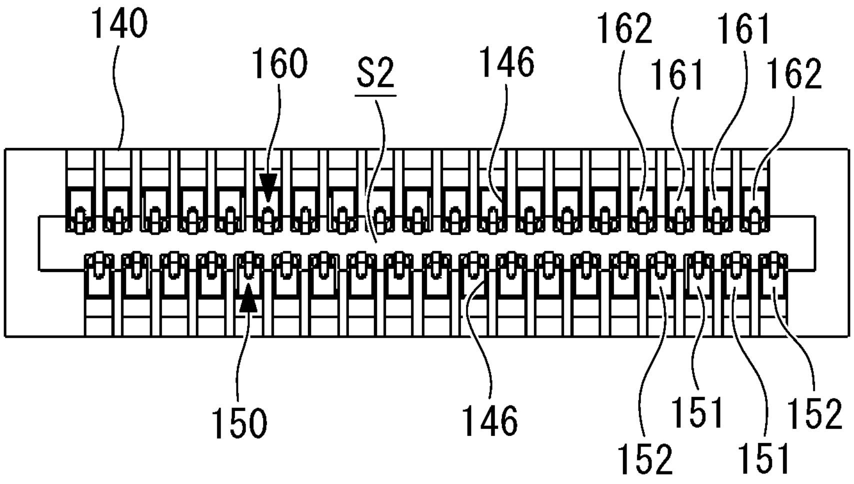
FIG. 14 is a plan view of the inner housing.
Figure 14:
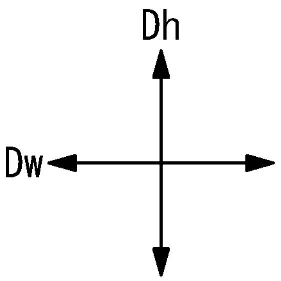

As illustrated in FIG. 5 and FIG. 14, the third pin group 150 and the fourth pin group 160 configured as described above are housed in the space S2 of the inner housing 140. The press-fit parts 151*b*, 152*b*, 161*b*, 162*b* of each contact pin are press-fitted into a plurality of grooves 146 formed in the inner wall face of the inner housing 140 and thereby held in the inner housing 140.

The plurality of grooves 146 corresponding to each pin group extend in the depth direction Dd and are arranged at a predetermined pitch in the width direction Dw. Further, the plurality of grooves 146 corresponding to the third pin group 150 face the plurality of grooves 146 corresponding to the fourth pin group 160 in the height direction Dh while being shifted by half a pitch in the width direction Dw.

As illustrated in FIG. 5, the inner housing 140 holding the third pin group 150 and the fourth pin group 160 is housed in the space S1 formed in the outer housing 110. In detail, the inner housing 140 is housed in a portion of the space S1 interposed between the first pin group 120 and the second pin group 130 in the height direction Dh.

In this state, the contact part 121*a* and the contact part 131*a* facing each other and the contact part 122*a* and the contact part 132*a* facing each other are at positions that are closer to the slot opening 113*a* in the depth direction Dd than the contact part 151*a* and the contact part 161*a* facing each other and the contact part 152*a* and the contact part 162*a* facing each other. Further, the mount part 121*c*, the mount part 122*c*, the mount part 131*c*, and the mount part 132*c* are at the same position in the depth direction Dd as the mount part 151*c*, the mount part 152*c*, the mount part 161*c*, and the mount part 162*c*.

As illustrated in FIG. 3, FIG. 4, FIG. 5, FIG. 17, and FIG. 18, the frame 170 and the second frame 180 are attached to the connector 100 configured as described above.

The frame 170 is an annular plate that surrounds the intermediate part 112 of the outer housing 110 and is in contact with the entire circumference of the intermediate part 112. In the case of the present embodiment, since the external shape of a cross-section of the intermediate part 112 (a cross-section in a face orthogonal to the depth direction Dd) is rectangular, the frame 170 is an annular plate having four sides.

The frame 170 preferably has higher rigidity than the outer housing 110 and is made of a metal, for example.

Figure 19:
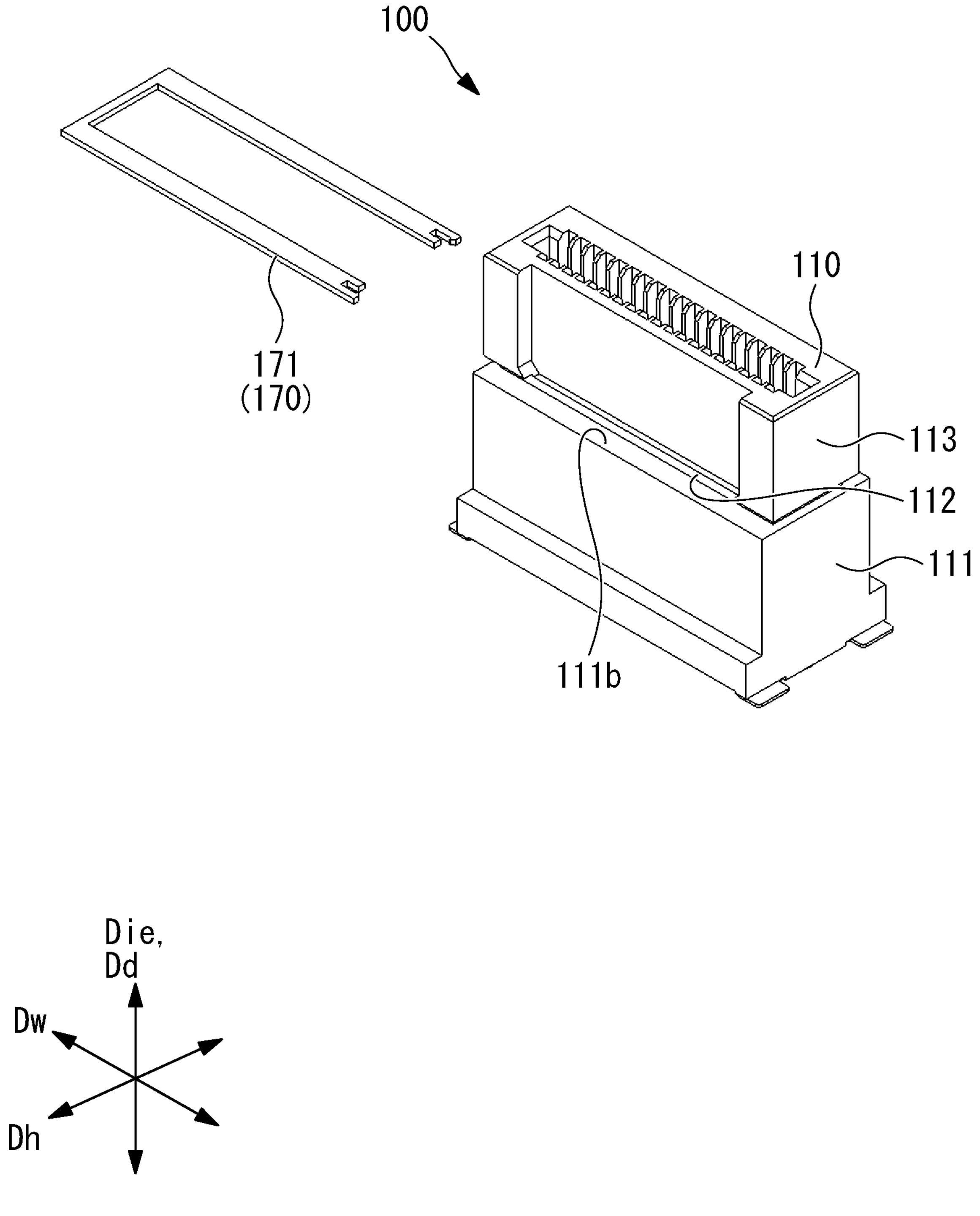
FIG. 19 is a perspective view illustrating a state where the connector according to the first embodiment is being assembled when viewed from above.
Figure 20:
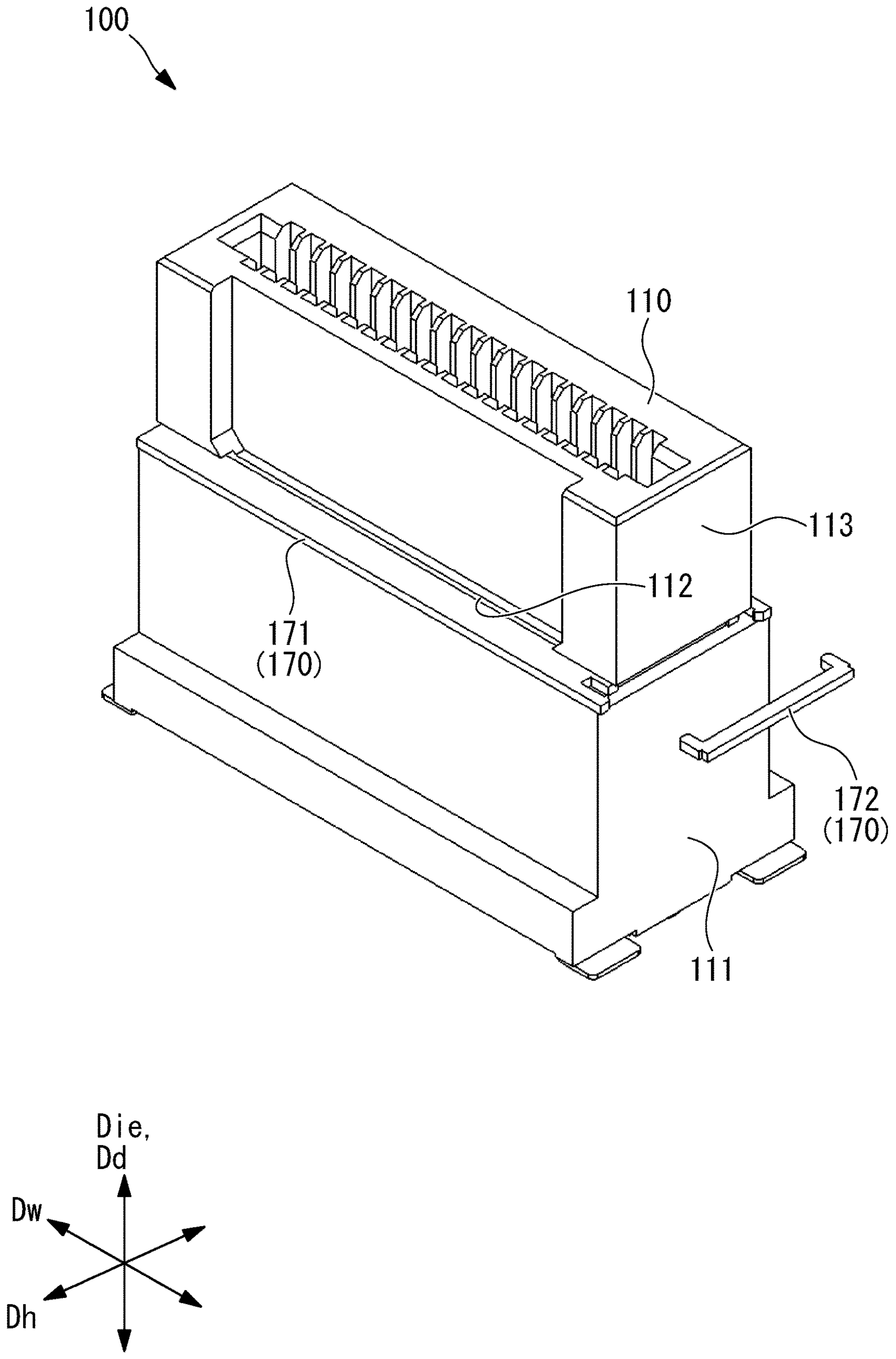
FIG. 20 is a perspective view illustrating a state where the connector according to the first embodiment is being assembled when viewed from above.
Figure 21:
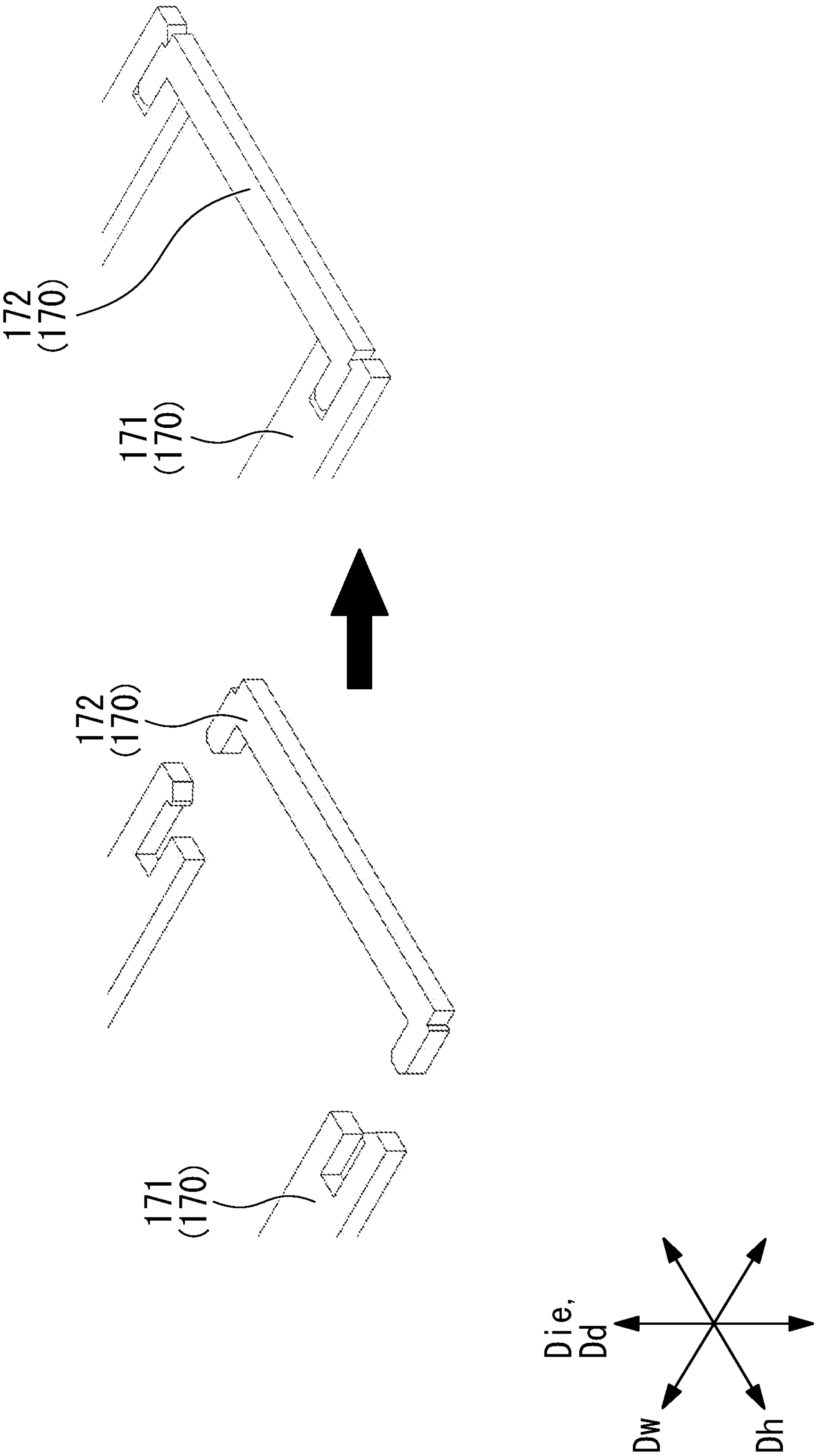
FIG. 21 is a partial enlarged view of a portion near a connection portion of the frame.

As illustrated in FIG. 19, FIG. 20, and FIG. 21, the frame 170 is formed of two portions. The two portions are, for example, a main body 171 and a divided piece 172.

The main body 171 is a portion forming three sides of the four sides and has a substantially U-shape. On the other hand, the divided piece 172 is a portion forming the remaining one side.

The frame 170 is formed in an annular shape having four sides by two ends of the divided piece 172 being connected to two ends of the main body 171. Example of methods for connecting the divided pieces 172 to the main body 171 may be fitting, press-fitting, crimping, or the like.

Figure 23:
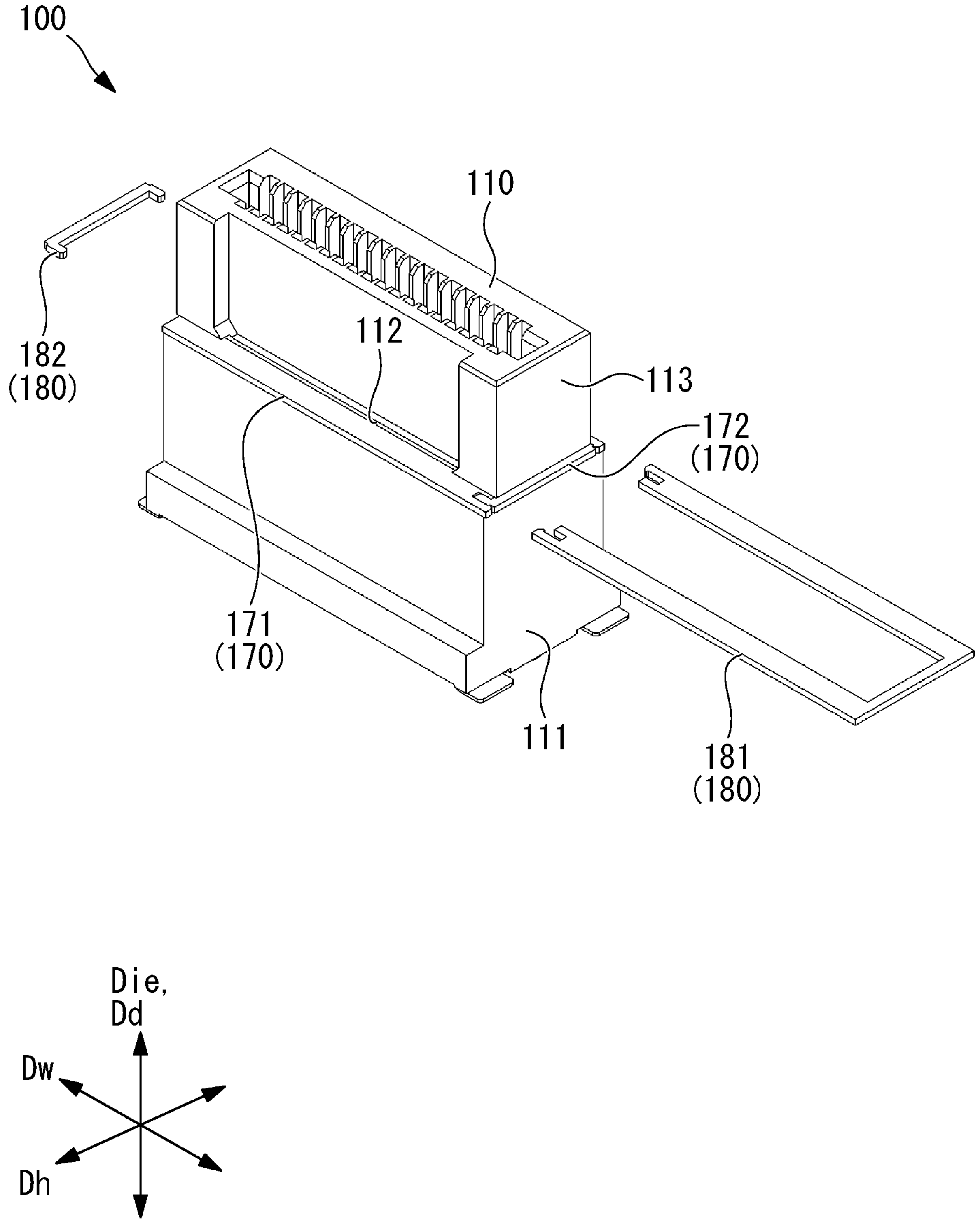
FIG. 23 is perspective view illustrating a state where the connector according to the first embodiment is being assembled when viewed from above.
Figure 24:
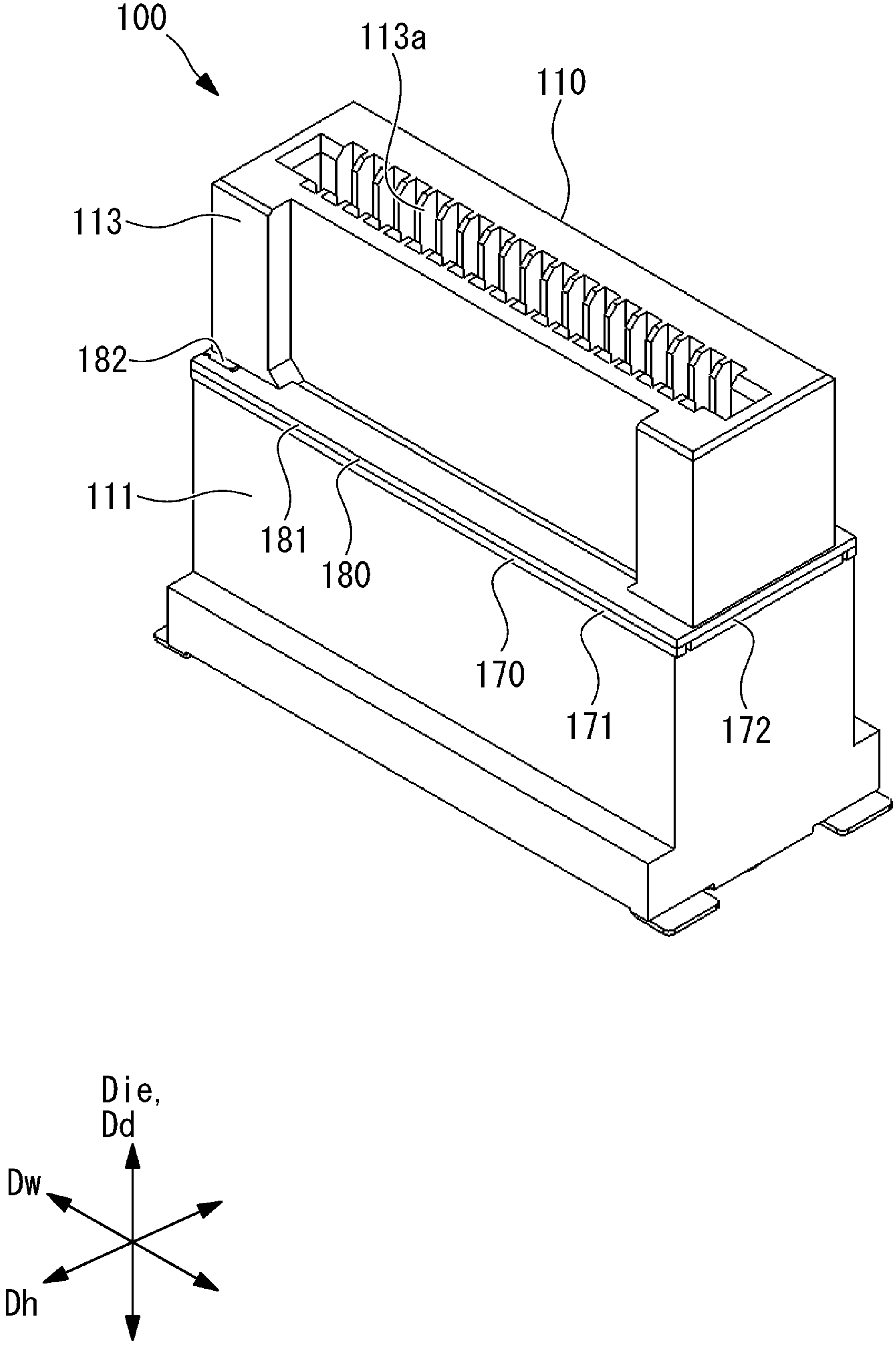
FIG. 24 is a perspective view illustrating a state where assembly of the connector according to the first embodiment is completed from above.

As illustrated in FIG. 23 and FIG. 24, the second frame 180 is an annular plate having four sides in which the same structure as the frame 170 is employed.

That is, the second frame 180 is an annular plate having a second main body 181 and a second divided piece 182.

The frame 170 configured as described above is attached to the intermediate part 112 of the outer housing 110 as follows.

First, as illustrated in FIG. 19 and FIG. 20, the main body 171 is inserted onto the intermediate part 112 so that the intermediate part 112 is inserted between two facing sides of the U-shaped main body 171.

Figure 22:
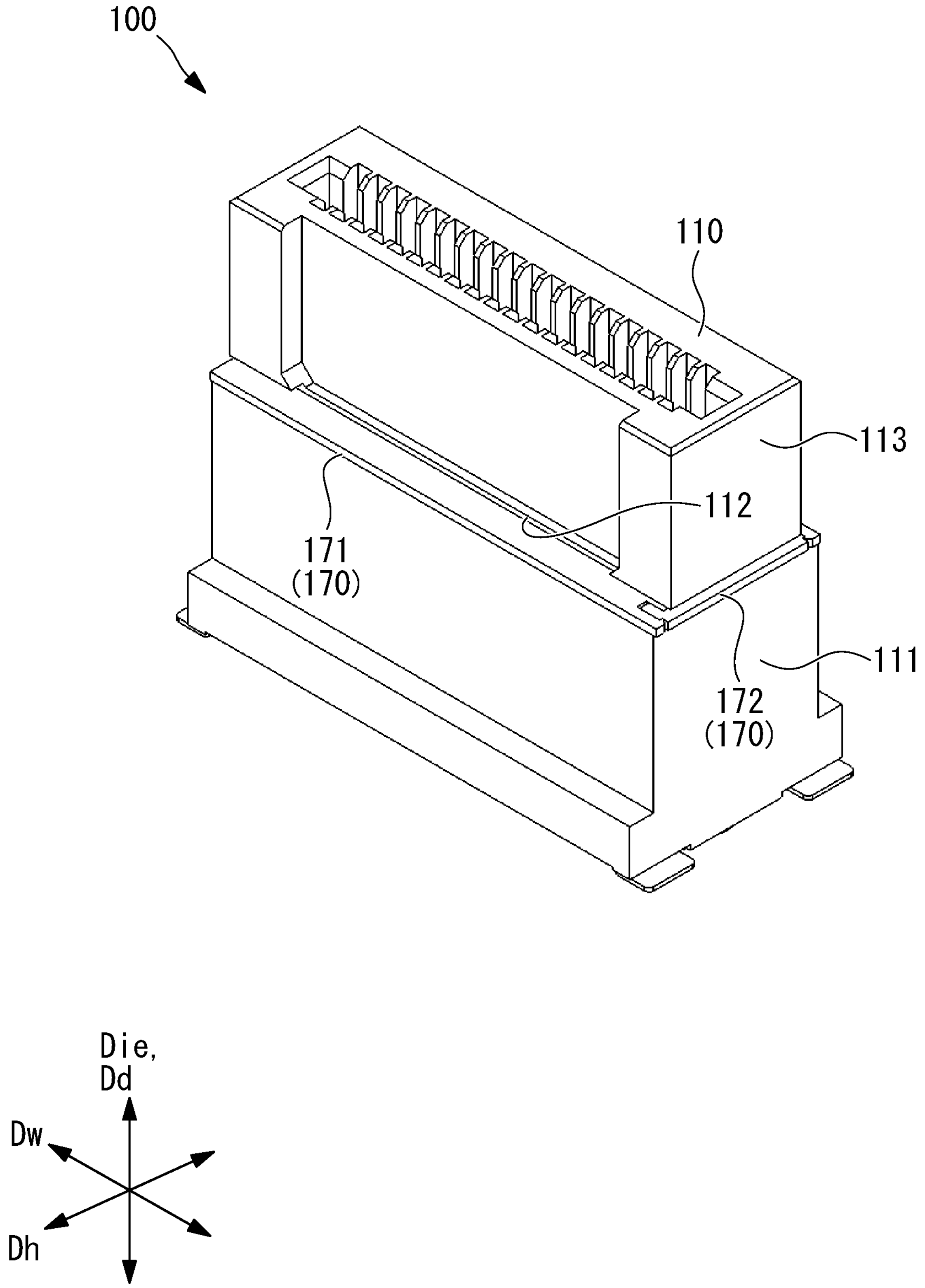
FIG. 22 is a perspective view illustrating a state where the connector according to the first embodiment has been assembled when viewed from above.

Next, as illustrated in FIG. 20, FIG. 21, and FIG. 22, the divided piece 172 is connected to the main body 171. Accordingly, the frame 170 is attached to the intermediate part 112 in a form of being overlapped on a stepped face 111*b* of the base part 111. Herein, the stepped face 111*b* is a face of the base part 111 around the intermediate part 112 and orthogonal to the depth direction Dd and is also a face parallel to the bottom face 111*a*.

Next, as illustrated in FIG. 23 and FIG. 24, the second main body 181 is inserted onto the intermediate part 112 so that the intermediate part 112 is inserted between two sides facing each other of the U-shaped second main body 181 and the second main body 181 comes into contact with the top surface of the frame 170.

Next, as illustrated in FIG. 24, the second divided piece 182 is connected to the second main body 181. Accordingly, the second frame 180 is attached to the intermediate part 112 in a form of being overlapped on the frame 170.

In this state, the dimensions of the frame 170 in the height direction Dh and the width direction Dw are approximately the same as the dimensions of the stepped face 111*b* of the base part 111 in the height direction Dh and the width direction Dw.

The same applies to the dimensions of the second frame 180.

The connector 100 configured as described above achieves the following advantageous effects.

As illustrated in FIG. 5, when the module board 11 is inserted into the slot opening 113*a*, the module board 11 enters the space between the first pin group 120 and the second pin group 130. In response, due to the thickness of the module board 11, a predetermined portion of the contact pin is deformed in a direction in which the contact parts 121*a*, 122*a* and the contact parts 131*a*, 132*a* are away from each other in the height direction Dh. Note that the predetermined portion of the contact pin is a portion that is closer to the tip than the press-fit parts 121*b*, 122*b*, 131*b*, 132*b*. Due to the deformation of the contact pins, the outward force (force along the height direction Dh, see arrows in FIG. 5) acts on the inner wall face of the outer housing 110 in contact with each contact pin. In such a case, without special reinforcement, the outer housing 110 may be deformed so as to be deflected outward.

Accordingly, as illustrated in FIG. 24, the frame 170 and the second frame 180 are attached to the intermediate part 112 of the outer housing 110, thereby the outer housing 110 is reinforced, and deformation of the outer housing 110 is suppressed. Further, since the deformation of the outer housing 110 is suppressed, the contact pressure of the contact pins against the electrode of the module board 11 can be suitably maintained. Thus, good signal transmission characteristics can be realized up to a high-frequency range.

Further, because of the constricted intermediate part 112 to which the frame 170 and the second frame 180 are attached, the inner dimensions of the frame 170 and the second frame 180 can be increased. This can improve the rigidity (section modulus) of the frame 170 and the second frame 180.

Note that the rigidity may be improved by increase of the outer dimensions of the frame 170 and the second frame 180, but in such a case, the connector 100 becomes larger. Further, when the dimension of each part of the connector 100 is determined by standards, it is not possible to increase the outer dimensions of the frame 170 and the second frame 180 in some cases in the first place.

Further, even with the constricted intermediate part 112 of the outer housing 110 in which the base part 111, the intermediate part 112, and the tip part 113 are integrated, since the frame 170 is configured to be dividable, the frame 170 can be attached to the intermediate part 112 by taking a step of inserting the main body 171 onto the intermediate part 112 and then connecting the divided piece 172 to the main body 171.

The same applies to the second frame 180.

Herein, the second frame 180 is not an essential component, and the connector 100 may have only the frame 170 attached as a reinforcing member.

Further, other frames (third frame, fourth frame . . . ) having the same configuration as the frame 170 and the second frame 180 may be attached to the connector 100.

<Position of Divided Piece and Second Divided Piece>

The second divided piece 182 is preferably arranged at a position (side) facing the divided piece 172 when viewed in the depth direction Dd. In the case of FIG. 24, the divided piece 172 and the second divided piece 182 face each other in the width direction Dw.

With such arrangement, the divided piece 172 and the second main body 181 overlap each other, the second divided piece 182 and the main body 171 overlap each other, and the divided piece 172 and the second divided piece 182 do not overlap each other.

Accordingly, since a connection portion between the main body 171 and the divided piece 172 whose strength may be inferior to other portions and a connection portion between the second main body 181 and the second divided piece 182 whose strength may be inferior to other portions are arranged alternately (that is, it is avoided that two connection portions are arranged only on one side of the intermediate part 112), the intermediate part 112 can be uniformly reinforced over the entire circumference thereof.

<Branch Structure of Ground Pin>

Figure 25:
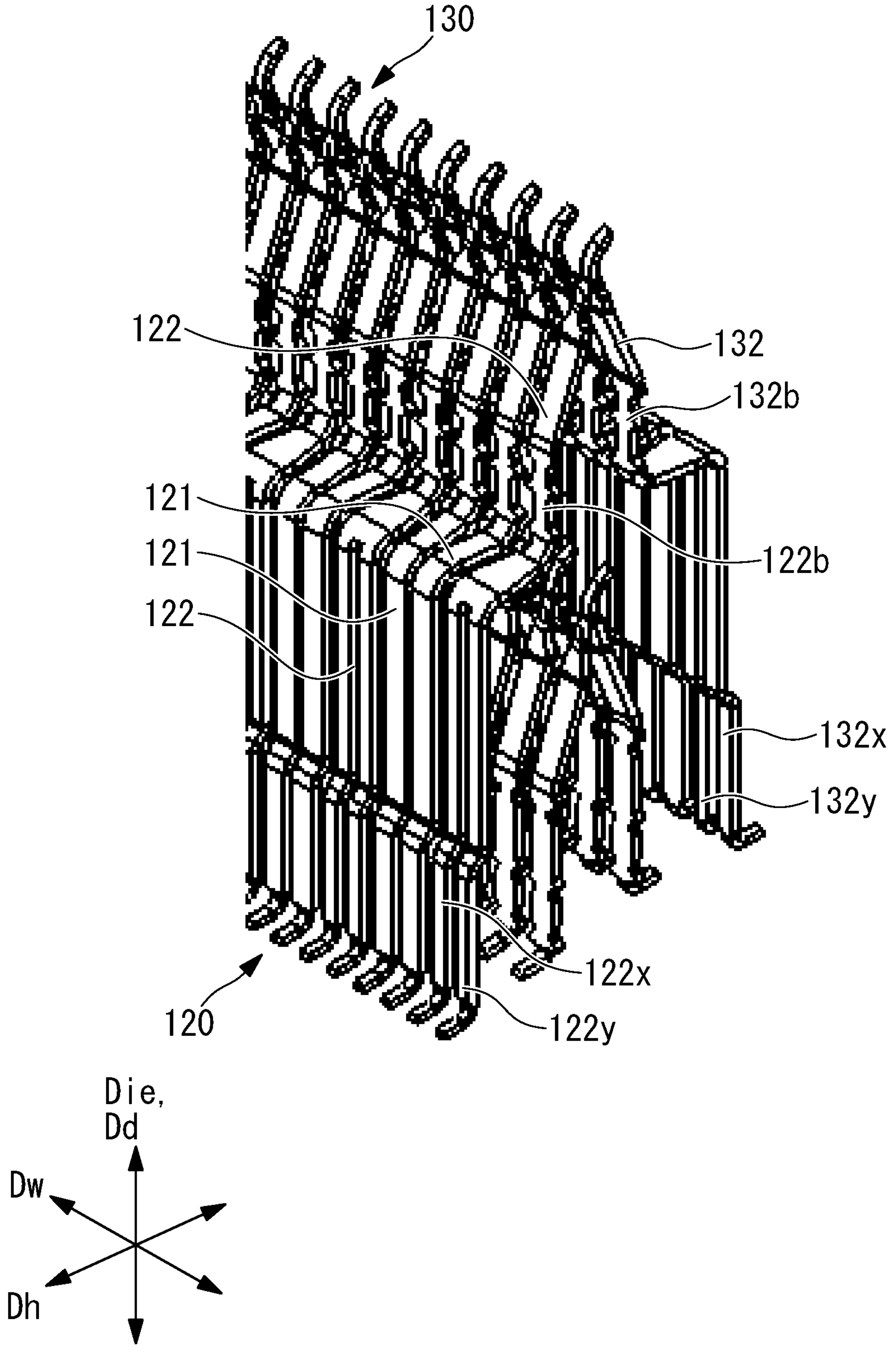
FIG. 25 is a perspective view of the first pin group to the fourth pin group when viewed from above (double ground).
Figure 26:
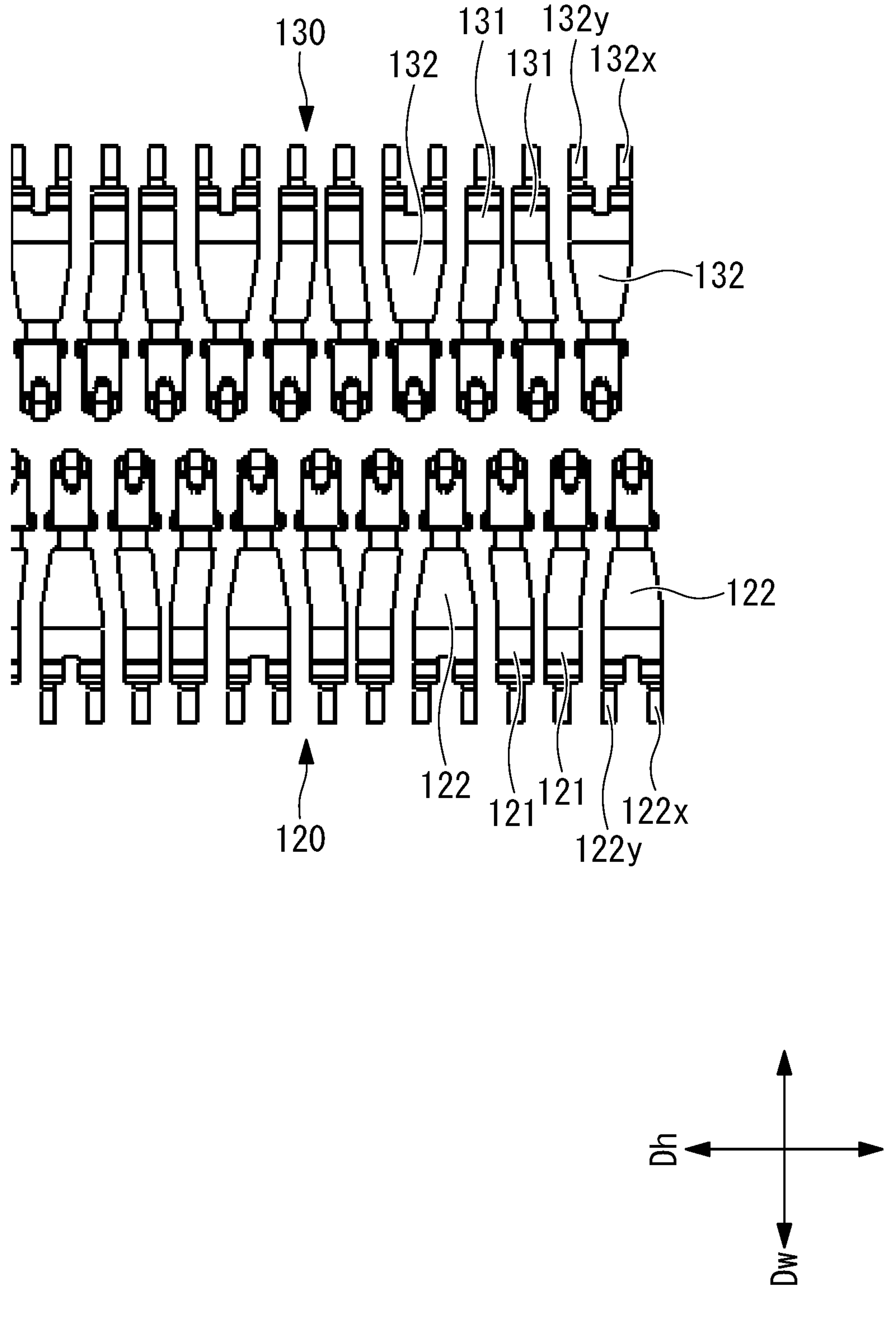
FIG. 26 is a plan view of the first pin group to the fourth pin group (double ground).

As illustrated in FIG. 25 and FIG. 26, a portion that is closer to the base end than the press-fit part 122*b* of the ground pin 122 included in the first pin group 120 may be branched into two portions of a first branch part 122*x* and a second branch part 122*y*, and a portion that is closer to the base end than the press-fit part 132*b* of the ground pin 132 included in the second pin group 130 may be branched into two portions of a first branch part 132*x* and a second branch part 132*y*.

Because the ground pin is branched in such a way, the first branch part 122*x* and the second branch part 122*y* and also the first branch part 132*x* and the second branch part 132*y* can be regarded as a single ground pin, and this is equivalent to that the contact pins in the region closer to the base ends than the press-fit part 121*b* and press-fit part 131*b* are arranged as with G-G-S-S-G-G-S-S-G-G- . . . -S-S-G-G.

Herein, "G" represents the ground pin, and "S" represents the signal pin.

Accordingly, the first pin group 120 and the second pin group 130 form so-called double ground, in which a pair of ground pins are arranged between a pair of signal pins (differential pair) and another differential pair, and crosstalk between differential pairs is thus reduced.

Figure 27:
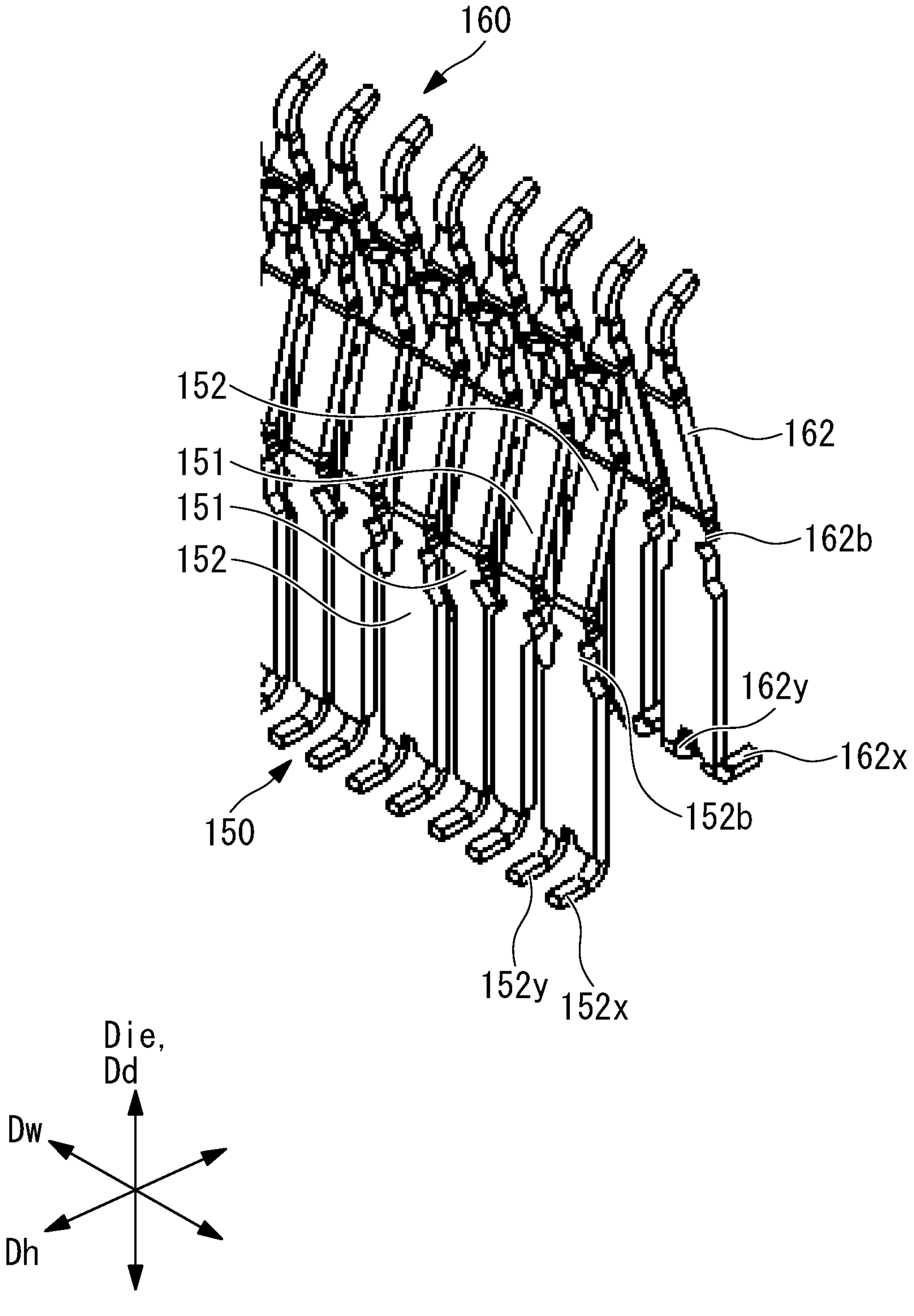
FIG. 27 is a perspective view of the third pin group and the fourth pin group when viewed from above (double ground).

Further, as illustrated in FIG. 27, a portion that is closer to the base end than the press-fit part 152*b* of the ground pin 152 included in the third pin group 150 may be branched into two portions of a first branch part 152*x* and a second branch part 152*y*, and a portion that is closer to the base end than the press-fit part 162*b* of the ground pin 162 included in the fourth pin group 160 may be branched into two portions of a first branch part 162*x* and a second branch part 162*y*. The reason for the above is the same as for the first pin group 120 and the second pin group 130.

Note that only a pair of the first pin group 120 and the second pin group 130 may be double ground as described above, only a pair of the third pin group 150 and the fourth pin group 160 may be double ground as described above, or all the pin groups of the first pin group 120 to the fourth pin group 160 may be double ground as described above.

<Recess of Connector>

As illustrated in FIG. 2, the optical module 10 has a protection wall 12.

The protection wall 12 is a plate-like portion for protecting the underside of the module board 11 and is provided substantially parallel to the module board 11.

As illustrated in FIG. 1 and FIG. 3, a recess 113*b* is formed in the tip part 113 of the connector 100.

The recess 113*b* is a portion recessed (a portion whose thickness is reduced) so as to prevent the connector 100 from interfering with the protection wall 12 when the optical module 10 has been inserted into the connector 100. Therefore, the shape of the recess 113*b* is adapted to the shape of the protection wall 12.

Second Embodiment

A connector according to the second embodiment of the present invention will be described with reference to the drawings.

Note that the present embodiment differs from the first embodiment in the form of the outer housing and the frame and is the same in other respects. Thus, the outer housing and the frame will be mainly described here.

Figure 28:
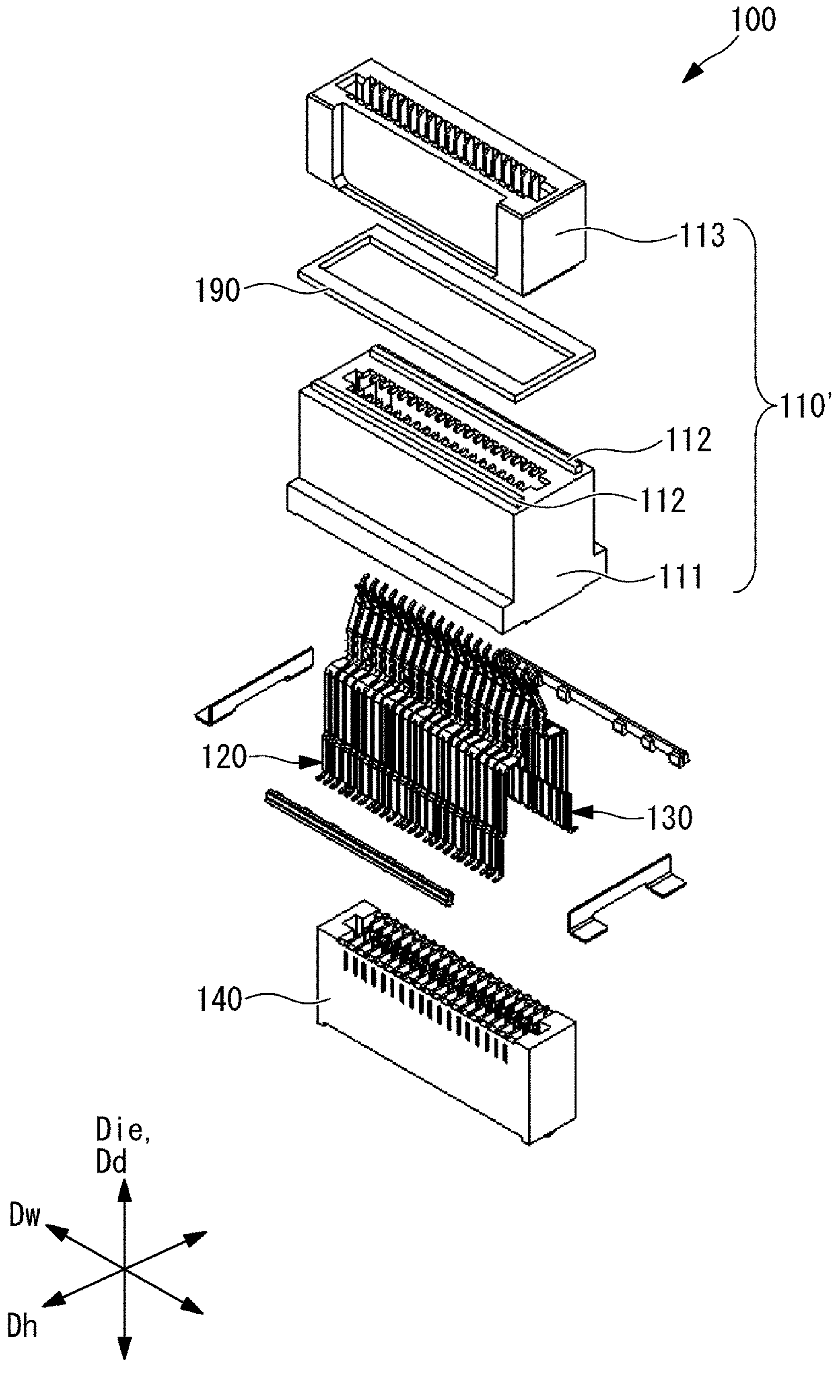
FIG. 28 is an exploded perspective view of a connector according to a second embodiment.
Figure 29:
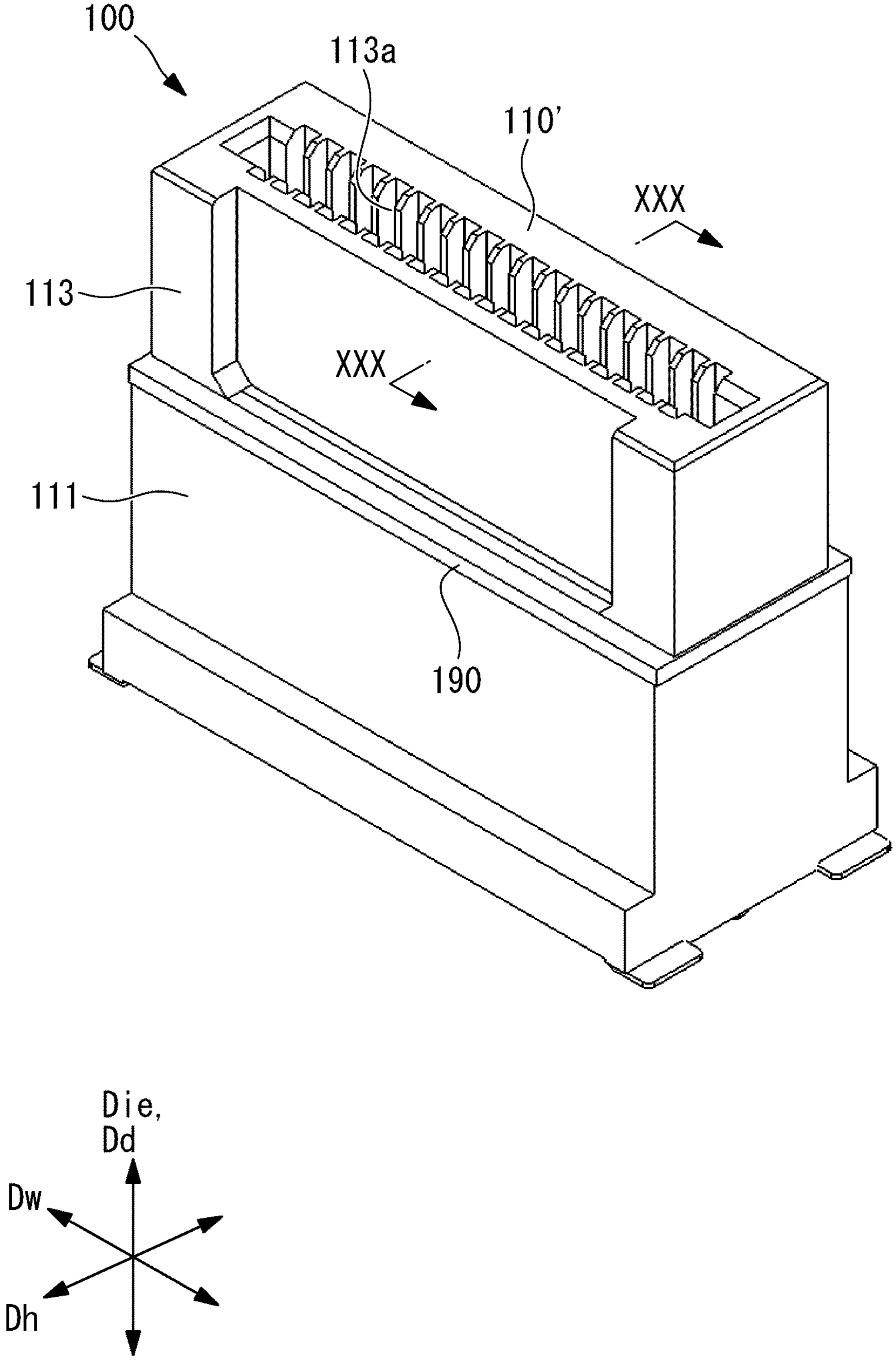
FIG. 29 is a perspective view of the connector according to the second embodiment when viewed from above.
Figure 30:
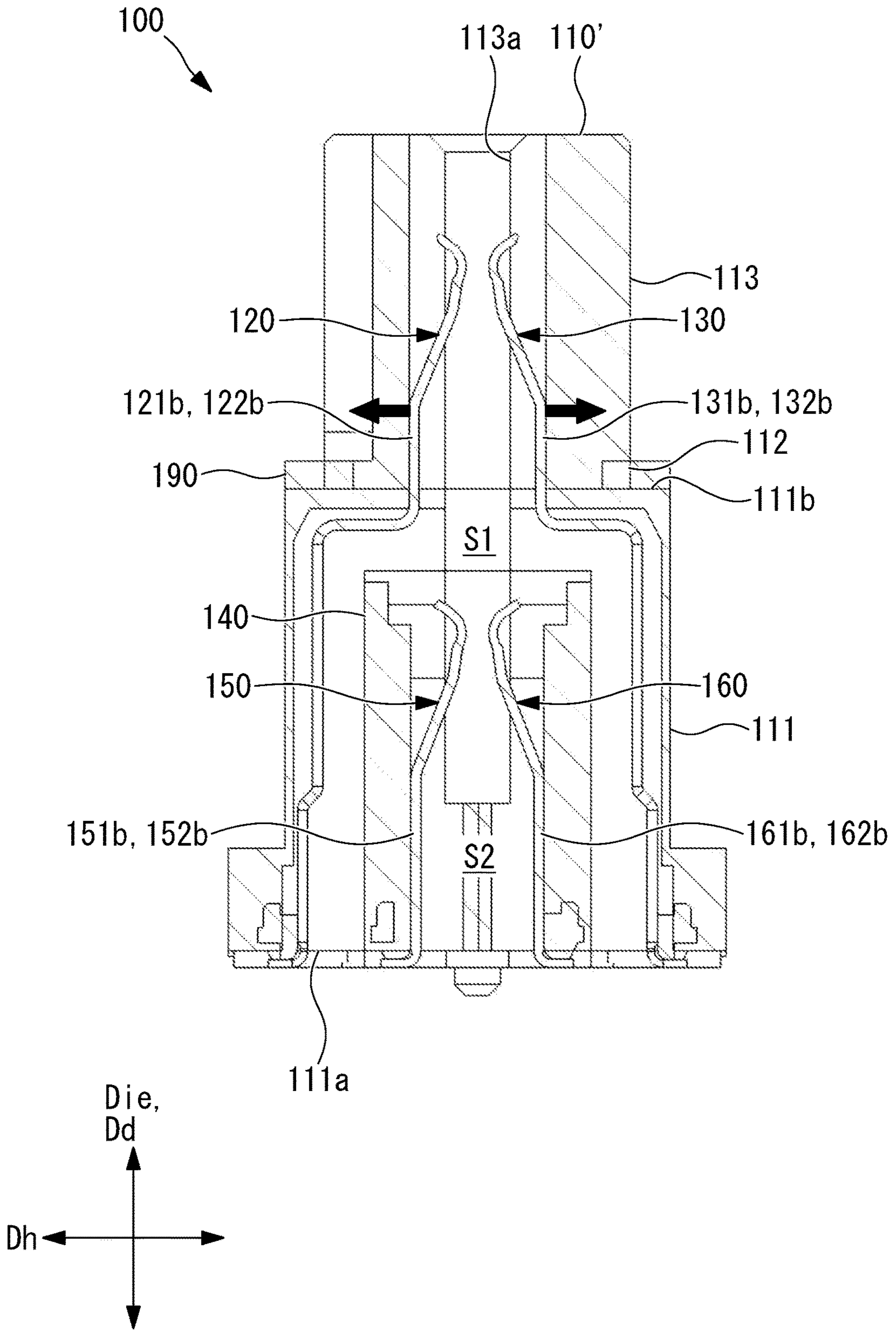
FIG. 30 is a sectional view taken along a cut line XXX-XXX illustrated in FIG. 29.

As illustrated in FIG. 28, FIG. 29, and FIG. 30, the outer housing 110' is configured such that the base part 111 and the tip part 113 are dividable from each other.

Herein, the intermediate part 112 may be integrally molded on the top of the base part 111 or may be integrally molded on the bottom of the tip part 113. Further, a part of the intermediate part 112 may be integrally molded on the top of the base part 111 and the remaining portion of the intermediate part 112 may be integrally molded on the bottom of the tip part 113.

A frame 190 is an annular plate having four sides in the same manner as the frame 170 or the like.

However, the frame 190 is not configured to be dividable, and the four sides thereof are integrated.

The frame 190 configured as described above is attached to the outer housing 110' as follows.

First, the frame 190 is arranged between the base part 111 and the tip part 113 separated from each other.

Next, the tip part 113 is attached to the base part 111. In this state, the intermediate part 112 is fitted inside the frame 190. Accordingly, the frame 190 is attached to the intermediate part 112 in a form of being overlapped on the stepped face 111*b* of the base part 111.

The connector 100 configured as described above achieves the following advantageous effects.

The frame 190 is attached to the intermediate part 112 of the outer housing 110', thereby the outer housing 110' is reinforced, and deformation of the outer housing 110' is thus suppressed. Further, since the deformation of the outer housing 110' is suppressed, the contact pressure of the contact pins against the electrode of the module board 11 can be suitably maintained. Thus, good signal transmission characteristics can be realized up to a high-frequency range.

Further, because of the constricted intermediate part 112 to which the frame 190 is attached, the inner dimensions of the frame 170 and the second frame 180 can be increased. This can improve the rigidity (section modulus) of the frame 190.

Note that the rigidity may be improved by increase of the outer dimensions of the frame 190, but in such a case, the connector 100 becomes larger. Further, when the dimension of each part of the connector 100 is determined by standards, it is not possible to increase the outer dimensions of the frame 190 in the first place.

Further, even with the constricted intermediate part 112, since the outer housing 110' is configured such that the base part 111 and tip part 113 are dividable from each other, the frame 190 can be attached to the intermediate part 112 by arranging the frame 190 between the separated base part 111 and tip part 113 in advance and taking a step of fitting the intermediate part 112 inside the frame 190 when attaching the tip part 113 to the base part 111.

LIST OF REFERENCE SYMBOLS

- 10 optical module (external module)
  - 11 module board (external module board)
  - 12 protection wall
- 20 circuit board
- 100 connector
  - 110, 110' outer housing
    - 111 base part
      - 111*a* bottom face
      - 111*b* stepped face
    - 112 intermediate part
    - 113 tip part
      - 113*a* slot opening
      - 113*b* recess
    - 116 groove
  - 120 first pin group
    - 121 signal pin (contact pin)
      - 121*a* contact part
      - 121*b* press-fit part
      - 121*c* mount part
    - 122 ground pin (contact pin)
      - 122*a* contact part
      - 122*b* press-fit part
      - 122*c* mount part
      - 122*x* first branch part
      - 122*y* second branch part
  - 130 second pin group
    - 131 signal pin (contact pin)
      - 131*a* contact part
      - 131*b* press-fit part
      - 131*c* mount part
    - 132 ground pin (contact pin)
      - 132*a* contact part
      - 132*b* press-fit part
      - 132*c* mount part
      - 132*x* first branch part
      - 132*y* second branch part
  - 140 inner housing
    - 146 groove
  - 150 third pin group
    - 151 signal pin (contact pin)
      - 151*a* contact part
      - 151*b* press-fit part
      - 151*c* mount part
    - 152 ground pin (contact pin)
      - 152*a* contact part
      - 152*b* press-fit part
      - 152*c* mount part
      - 152*x* first branch part
      - 152*y* second branch part
  - 160 fourth pin group
    - 161 signal pin (contact pin)
      - 161*a* contact part
      - 161*b* press-fit part
      - 161*c* mount part
    - 162 ground pin (contact pin)
      - 162*a* contact part
      - 162*b* press-fit part
      - 162*c* mount part
      - 162*x* first branch part
      - 162*y* second branch part
  - 170 frame (reinforcing member)
    - 171 main body
    - 172 divided piece
  - 180 second frame (second reinforcing member)
    - 181 second main body
    - 182 second divided piece
  - 190 frame
- S1 space
- S2 space

What is claimed is:

1. A connector configured to be mounted on an external circuit board and receive an external module board of an external module inserted along a first direction, the connector comprising:

when a direction orthogonal to the first direction is defined as a second direction, and a direction orthogonal to the first direction and the second direction is defined as a third direction, a plurality of contact pins configured to come into contact with the external module board;

a housing holding the plurality of contact pins; and a first reinforcing member attached to the housing, wherein the housing includes a base part, an intermediate part, and a tip part from the external circuit board side along the first direction, wherein the base part includes a bottom face facing the external circuit board, wherein the tip part includes a slot opening into which the external module board is to be inserted, wherein the intermediate part includes a smaller dimension in the second direction and/or a smaller dimension of the third direction than the base part and the tip part, and wherein the first reinforcing member is an annular plate having four sides surrounding the intermediate part, and an inner peripheral surface of the four sides of the first reinforcing member is in contact with an outer peripheral surface of the intermediate part in the second direction and the third direction.

2. The connector according to claim 1, wherein the tip part and the base part have substantially the same dimension in the second direction, and wherein the intermediate part includes at least a smaller dimension in the second direction than the base part and the tip part.

3. The connector according to claim 1, wherein the first reinforcing member is configured such that at least one side of the four sides and the remaining sides are dividable from each other.

4. The connector according to claim 3, comprising a second reinforcing member attached to the housing, wherein the second reinforcing member is an annular plate having four sides surrounding the intermediate part, and is overlapped on the first reinforcing member and configured such that at least one side of the four sides and the remaining sides are dividable from each other.

5. The connector according to claim 4, wherein the first reinforcing member is configured such that a divided piece that is one side of the four sides is dividable from remaining three sides, wherein the second reinforcing member is configured such that a second divided piece that is one side of the four sides is dividable from remaining three sides, and wherein the divided piece and the second divided piece are at positions facing each other when viewed in the first direction.

6. The connector according to claim 1, wherein the housing is configured such that the base part and the tip part are dividable from each other.

7. The connector according to claim 1, wherein the plurality of contact pins have, from a tip to a base end, a contact part configured to come into contact with the external module board, a press-fit part configured to be press-fitted into the housing, and a mount part configured to be mounted on the external circuit board, and include a signal pin for signal transmission and a ground pin for grounding, wherein in the ground pin, a portion that is closer to the mount part than the press-fit part is branched into two portions.

8. The connector according to claim 1, wherein the external module is a module having a protection wall for protecting the external module board, the protection wall is provided substantially parallel to the external module board, wherein the tip part includes a recess adapted to a shape of the protection wall.

* * * * *